United States Patent
Zbilut et al.

(10) Patent No.: US 8,422,820 B2
(45) Date of Patent: Apr. 16, 2013

(54) METHODS USING RECURRENCE QUANTIFICATION ANALYSIS TO ANALYZE AND GENERATE IMAGES

(75) Inventors: Joseph P. Zbilut, Skokie, IL (US); Paolo Sirabella, Rome (IT); Marta Bianciardi, Rome (IT); Alfredo Colosimo, Rome (IT); Gisela Hagberg, Rome (IT); Alessandro Giuliani, Rome (IT)

(73) Assignee: Rush University Medical Center, Chicago, IL (US)

( * ) Notice: Subject to any disclaimer, the term of this patent is extended or adjusted under 35 U.S.C. 154(b) by 1260 days.

(21) Appl. No.: 12/203,724

(22) Filed: Sep. 3, 2008

(65) Prior Publication Data

US 2009/0080725 A1 Mar. 26, 2009

Related U.S. Application Data

(62) Division of application No. 11/121,745, filed on May 4, 2005, now Pat. No. 7,430, 313.

(60) Provisional application No. 60/567,994, filed on May 4, 2004, provisional application No. 60/607,284, filed on Sep. 3, 2004.

(51) Int. Cl.
*G06K 9/00* (2006.01)

(52) U.S. Cl.
USPC ........... 382/278; 382/128; 382/134; 382/155; 382/160

(58) Field of Classification Search .......... 382/128–134, 382/155–160, 278

See application file for complete search history.

(56) References Cited

U.S. PATENT DOCUMENTS

6,051,209 A * 4/2000 Metz et al. ............ 424/9.4
6,195,103 B1 2/2001 Stewart (Continued)

FOREIGN PATENT DOCUMENTS

| EP | 1345154 | 9/2003 |
| WO | WO 99/05641 | 2/1999 |
| WO | WO 03/077182 | 9/2003 |

OTHER PUBLICATIONS

Elias et al. "Recurrence Quantification Analysis Applied to Sequential Speckle Images of Machined Surface for Detection of Chatter in Turning" 2008, Interferometry XIV:Applications; Proc. of SPIE vol. 7064.*

(Continued)

*Primary Examiner* — Wesley Tucker
(74) *Attorney, Agent, or Firm* — Foley & Lardner LLP

(57) ABSTRACT

Methods for identifying and quantifying recurrent and deterministic patterns in digital images are provided. The methods, which are based on Recurrence Quantification Analysis (RQA), generate similarity or dissimilarity distance matrices for digital images that may be used to calculate a variety of quantitative characteristics for the images. Also provided are methods for identifying and imaging spatial distributions of time variable signals generated from dynamic systems. In these methods a time variable signal is recorded for a plurality of area or volume elements into which a dynamic system has been sectioned and RQA is used to calculate one or more RQA variables for each of the area or volume elements, which may then be used to generate a two or three dimensional image displaying the spatial distribution of the RQA variables across the system.

19 Claims, 50 Drawing Sheets

U.S. PATENT DOCUMENTS

| | | | |
|---|---|---|---|
| 6,240,217 B1 | 5/2001 | Ercan et al. | |
| 6,547,746 B1 * | 4/2003 | Marino | 600/554 |
| 6,731,974 B2 | 5/2004 | Levitan et al. | |
| 7,356,805 B2 | 4/2008 | Ding et al. | |
| 2006/0098876 A1 | 5/2006 | Buscema | |

OTHER PUBLICATIONS

Facchini et al. "Identification of Bifurcations of Distributed Systems Using Generalized Recurrence Qunatifiation Analysis" 2004, France; Center for the Study of Complex Systems, University of Siena, Italy; vol. 15, part 1.*

Trulla, et al. "Recurrence QuantificationAnalysis of the Logistic Equation with Transients" 1996, Physics Letters A; vol. 223 http://www.sciencedirect.com/science/article/pii/S0375960196007414.*

Berlage, "Guided Image Interpretation in Proteome Analysis," available on web prior to May 4, 2005 at http://www.fit.fraunhofer.de/~berlage/BerlageProteome.pdf.

Friston, K. J., Jezzard, P. and Turner, R. (1994) Analysis of Functional MRI Time-Series. Human Brain Mapping 1,153-171.

Conrads, et al., "Diagnostic Proteomics," Business Briefing: Future Drug Discovery, 2003, pp. 88-93.

Zbilut, et al., "Embeddings and Delays as Derived from Quantification of Recurrence Plots," Physics Letters A, vol. 171, No. 3,4, Dec. 7, 1992, pp. 199-203.

Webber, Jr., et al., "Dynamical Assessment of Physiological Systems and States Using Recurrence Plot Strategies," J. Appl. Physiol., vol. 76, No. 2, 1994, pp. 965-973.

Zbilut, et al., "Recurrence Quantification Analysis and Principal Components in the Detection of Short Complex Signals," arXiv:chao-dyn/9712017 v 1, Dec. 21, 1997. Available on the web at http://arxiv.org/PS_cache/chao-dyn/pdf/9712/9712017.pdf.

Zbilut, et al., "Recurrence Quantification Analysis in Structure-Function Relationships of Proteins: An Overview of a General Methodology Applied to the Case of TEM-1 β-lactamase," Protein Engineering, vol. 11, No. 2, 1998, pp. 87-93.

Frontali, et al, "Similarity in Oligonucleotide Usage in Introns and Intergenic Regions Contributes to Long-Range Correlation in the *Caenorhabditis elegans* Genome," Gene, vol. 232, 1999, pp. 87-95.

Marwan, et al., "Recurrence-Plot-Based Measures of Complexity and their Application to Heart-Rate Variability Data," Physical Review E, vol. 66, 2002, pp. 026702-1-026702-8.

Zbilut, et al., "Recurrence Quantification Analysis as a Tool for Nonlinear Exploration of Nonstationary Cardiac Signals," Medical Engineering & Physics, vol. 24, 2002, pp. 53-60.

Castellini, et al., "Applications of Recurrence Quantified Analysis to Study the Dynamics of Chaotic Chemical Reaction," arXiv:nlin.CD/0211050 v1, Nov. 28, 2002. Available on the web at http://arxiv.org/PS_cache/nlin/pdf/0211/0211050.pdf.

Marwan, et al., "Extended Recurrence Plot Analysis and its Application to ERP Data," arXiv:physics/0212082 v1, Dec. 20, 2002. Available on the web at http://arxiv.org/PS_cache/physics/pdf/0212/0212082.pdf.

"Recurrence Plots and Dynamical System Analysis," printed Mar. 4, 2004 from http://www.cs.colorado.edu/~lizb/rps.html.

Zimatore, "Recurrence Quantification Analysis and Transient Otoacoustic Emissions," printed Mar. 4, 2004 from http://web.unife.it/progetti/oae/whitepapers/signal_proc/rqa.html.

Maripuri, "Recurrence Quantification Analysis of Three-Dimensional Protein Structures," printed Mar. 4, 2004 from http://alumni.imsa.edu/~maripuri/mentorship/mentorship_report_1999.h . . . .

Kurths, et al., "Testing Nonlinearity in Radiocarbon Data," printed Apr. 8, 2004 from http://www.agnld.uni-potsdam.de/~marwan/rp/index.php?a=biblio . . . .

Evfim'evskij, et al., "Analyzing the Efficiency of Algorithms in Enhancing the Informative Value of X-Ray Images at Digital Fluorography," Meditsinskaya Tekhnika, No. 3, 2001, pp. 35-40 (Abstract).

Li, "Splitting-Integrating Methods for the Image Transformations T and TSUP Minus SUP1T," Computers & Mathematics with Applications, vol. 32, No. 3, Aug. 1996, pp. 39-60 (Abstract).

Oh, et al., "A Multistage Perceptual Quality Assessment for Compressed Digital Angiogram Images," IEEE Trans. Med. Imaging, vol. 20, No. 12, Dec. 2001, pp. 1352-1361 (Abstract).

* cited by examiner

FIG. 11

|       | R0WTC | R1WTC | R2WTC | R3WTC | R4WTC |
|-------|-------|-------|-------|-------|-------|
| R0WTC | 1.000 |       |       |       |       |
| R1WTC | 0.637 | 1.000 |       |       |       |
| R2WTC | 0.701 | 0.642 | 1.000 |       |       |
| R3WTC | 0.809 | 0.721 | 0.716 | 1.000 |       |
| R4WTC | 0.673 | 0.718 | 0.689 | 0.785 | 1.000 |

|       | R0ATD | R1ATD | R2ATD | R3ATD | R4ATD |
|-------|-------|-------|-------|-------|-------|
| R0ATD | 1.000 |       |       |       |       |
| R1ATD | 0.779 | 1.000 |       |       |       |
| R2ATD | 0.908 | 0.754 | 1.000 |       |       |
| R3ATD | 0.942 | 0.746 | 0.928 | 1.000 |       |
| R4ATD | 0.813 | 0.869 | 0.813 | 0.812 | 1.000 |

|  | R0ATD | R1ATD | R2ATD | R3ATD | R4ATD |
|---|---|---|---|---|---|
| R0WTC | -0.154 | -0.109 | -0.238 | -0.225 | -0.140 |
| R1WTC | -0.163 | -0.177 | -0.237 | -0.231 | -0.232 |
| R2WTC | -0.477 | -0.304 | -0.539 | -0.556 | -0.362 |
| R3WTC | -0.218 | -0.203 | -0.287 | -0.264 | -0.231 |
| R4WTC | -0.267 | -0.081 | -0.315 | -0.326 | -0.163 |

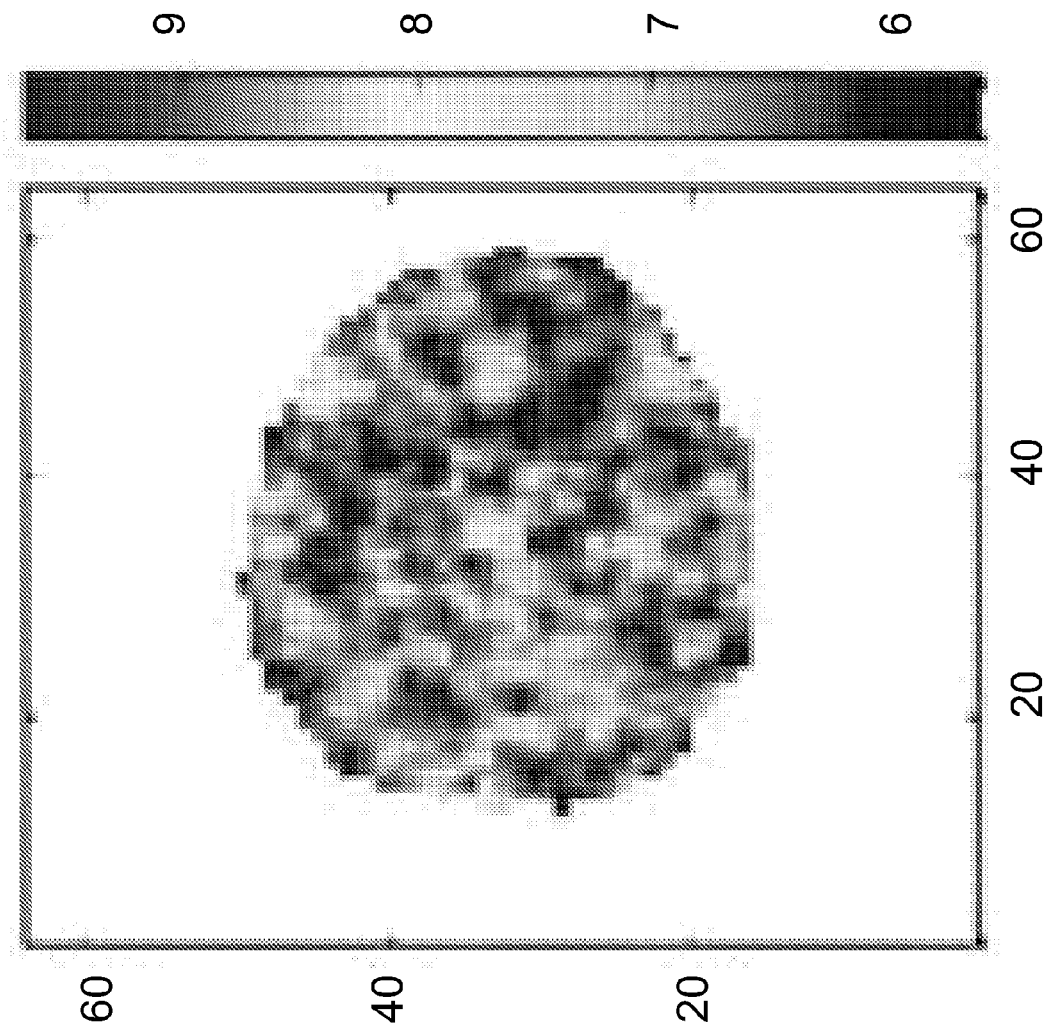

US 8,422,820 B2

METHODS USING RECURRENCE QUANTIFICATION ANALYSIS TO ANALYZE AND GENERATE IMAGES

CROSS-REFERENCE TO RELATED APPLICATIONS

This application is a Divisional of U.S. patent application Ser. No. 11/121,745, filed May 4, 2005 which claims priority from U.S. Provisional Patent Application Ser. No. 60/567,994, filed May 4, 2004, and from U.S. Provisional Patent Application Ser. No. 60/607,284, filed Sep. 3, 2004, the entire disclosures of which are incorporated herein by reference.

BACKGROUND

Increasingly, progress in modern science is being driven by digitized images. This is particularly true in the biological and medical sciences where data takes the form of digital photographs, radiographs, ultrasound images, digital images generated from analytical microassays, and magnetic resonance images, including functional magnetic resonance images.

Functional magnetic resonance imaging (fMRI) is a version of magnetic resonance imaging that identifies local brain activity rather than only structures. Functional magnetic resonance imaging produces two or three dimensional images of activated brain regions based on the detection of the indirect effects of neuroactivity on local blood volume, flow and oxygen saturation. One common form of functional MRI is known as blood oxygen level dependent imaging, or BOLD. The BOLD technique is based on measuring changing ratios of deoxy- and oxy-hemoglobin as a result of increased neuronal metabolic rate and energetic requirements over a period of time. The physiological processes detected using the BOLD technique influence the effective transverse relaxation time of a magnetic resonance (MR) signal which in turn induces activation related signal variations in each volume element of a brain. The overall results are then transformed into a visual output, where active volume elements are rendered by false colors corresponding to the significance of the difference of the dynamic features of the signal in that volume element, as compared to an external reference model.

Unfortunately, many currently available diagnostic digitized images provide only limited diagnostic information. In many cases these images may be evaluated only qualitatively, making it difficult to extract all of the relevant information from the images and to accurately compare or correlate different images. In other cases, the digitized images may be generated using subjective models of the underlying data which may limit the accuracy of the images. For example, the choice of a reference model in the conventional analysis of fMRI data remains arbitrary and subject to systematic and unforeseeable pitfalls, such as those induced by delays or differences in the shape between the MR signal variation and the adopted reference model. Thus, any conclusions drawn from BOLD images so produced will be dependent on the choice of reference model and therefore somewhat subjective.

One analytical technique that has proven successful for the quantitative analysis of linear and non-linear dynamic systems is Recurrence Quantification Analysis (RQA). Recurrence analysis was developed from the original idea by Eckmann et al., that significant periodic structure might be uncovered in physical processes by mathematically embedding the ordered series in higher dimensional space and then creating a rule for determining what is considered a recurrence of a point in the series. These points, then, can be plotted on a symmetric matrix. Deterministic, i.e., non-random, activity can be observed by short line segments parallel to the main diagonal. (See Eckmann et al., *Europhys. Lett.*, 4, 973-976 (1987).) Later, several measures were introduced to quantify features of the RQA plots, including "REC" which quantifies the number of recurrences in a plot and percent determinism (DET) which gives the number of recurrent points which form diagonal line segments in a plot. (See e.g., Zbilut et al., *Phys. Lett. A*, 171, 199-203 (1992); Webber et al., *J. Appl. Physiol.*, 76, 965-973 (1994); Giuliani et al., *Biol. Cybernet.*, 74, 181-187 (1996); Trulla et al., *Phys. Lett. A*, 223, 225-260 (1996) and Zak et al., *From Instability to Intelligence*, Springer, Berlin (1997).)

To date, RQA has focused primarily on dynamic systems. Dynamic systems studied using RQA include studies of respiratory systems, cardiac signals, hearing patterns and brain activity as determined by electroencephalograms (EEGs). In these studies, a time variable signal is measured at two different times (e.g., during and after or before and during an event of interest) and the corresponding RQA variables are calculated for these signals. The temporal distribution of the RQA variables is then analyzed. More recently, RQA has been used to study non-dynamic characteristics of some systems, including protein structure and genetic sequences. (See e.g. Zbilut et al., *Protein Engineering*, 11, 87-93 (1998) and Frontali et al., *Gene*, 232, 87-95 (1999).)

RQA has not previously been used to analyze digital images. Nor has RQA been used to provide visual images from a spatial distribution of RQA variables generated from time variable signals collected from a plurality of area or volume elements for a dynamic system.

SUMMARY

The present invention relates to methods of using RQA in combination with images, such as digital images, to maximize the accessible information for a system under study. In a first aspect of the invention, RQA is used to abstract quantitative data from an image. In a second aspect of the invention, RQA is used to generate an image from time variable signals for a dynamic system.

The first aspect of the invention provides a method for quantifying recurrent patterns in digital images. In carrying out the method, a distance matrix is generated from the digital image. This distance matrix may be generated as follows: first, each pixel in the digital image is assigned a numerical value based on the color of that pixel. A first value matrix is then defined by a window which frames a plurality of pixels in the digital image. The numerical values for the framed pixels provide the elements of the value matrix. An additional value matrix is then defined by sliding the window over by a set number of pixels to frame another set of pixels in the digital image. These steps are repeated until the digital image has been divided into a plurality of overlapping value matrices. Next, one of the plurality of overlapping value matrices is selected as a reference value matrix and a distance is calculated between that reference value matrix and each of the other value matrices in the plurality of overlapping value matrices. This distance may be calculated as a similarity distance or a dissimilarity distance. For the purposes of the disclosure the term "(dis)similarity" will be used to mean "similarity or dissimilarity". In one embodiment, the distance is calculated as a Euclidian distance. Once these distances have been calculated, they are arranged sequentially as a row in a distance matrix such that each element in the row corresponds to one of the calculated distances. The preceding steps are then repeated until each matrix in the plurality of overlapping value matrices has been selected as the reference value matrix and the resulting calculated distances have been arranged as rows in a distance matrix to provide a square distance matrix.

Several useful quantitative characteristics may be derived from the distance matrix for a digital image. For example, recurrences may be identified for the distance matrix where a recurrence is an element in a distance matrix that meets a selected cut-off criterion. From these recurrences, the percentage of determinism of the distance matrix may be calculated. Determinism provides a measure of the number of recurrences that appear in topologically nearby areas. More specifically, the percentage of determinism is the percentage of recurrences that appear in topologically nearby areas in the digital image as determined by selected topological cut-off distance. A local recurrence value may be calculated for each row in the distance matrix as the fraction of recurrences in that row. A global recurrence value for distance matrix may be calculated from the local recurrence values. For example, the global recurrence value may be calculated as an average of the local recurrence values.

Other useful quantitative characteristics include the short range determinism profile (SRDP) and the long range determinism profile (LRDP). Where the SRDP is calculated by dividing a plot of (dis)similarity distances versus topological distances into equally-sized sections along the topological distance axis between the origin and a selected topological cut-off distance and generating a vector comprising an element for each section, where the element is the sum of the recurrences in that section. Similarly, the LRDP for an image may be calculated by dividing a plot of (dis)similarity distances versus topological distances into equally-sized sections along the topological distance axis between the origin and the maximum topological distance and generating a vector comprising an element for each section, where the element is the sum of the recurrences in that section.

Using the methods provided herein different digital images may be analyzed and comparisons and correlations between the images may be computed from the quantitative characteristics identified for the images.

The invention also provides a device for quantifying recurrent patterns in digital images. The device includes an interface that receives a digital image and programmed instructions stored in a memory and configured to quantify recurrent patterns in digital images in accordance with the methods provided herein.

The invention further provides a computer program product that quantifies recurrent patterns in digital images. The computer program product includes computer code configured to quantify recurrent patterns in digital images in accordance with the methods provided herein.

A second aspect of the invention provides methods for identifying and imaging spatial distributions of time variable signals generated from dynamic systems. The methods, which use recurrent quantification analysis, provide a user with a visual image of the dynamics of the system. The methods include the steps of collecting a time variable signal for a plurality of area or volume elements which define the system. At least one RQA variable is then calculated for each area or volume element. The calculated RQA variables may then be displayed in the form of a two or three dimensional spatial image of the system. In one embodiment of the present methods the RQA variable for each area or volume element is represented as a pixel or voxel in a digital image, where the shading for each pixel or voxel in the image corresponds to the value of the RQA variable calculated for that pixel or voxel.

The methods of this second aspect of the invention may be used to study any system emitting time variable signals that vary spatially across the system. Time variable signals that may be analyzed using these methods include any dynamic signals of interest to a user. Functional magnetic resonance signals resulting from brain activity in different regions of a brain are examples of dynamic signals that may by analyzed in accordance with these methods.

The invention also provides a device for analyzing spatial distributions of time variable signals. The device includes an interface that receives the time variable signals from a plurality of area or volume elements defining a dynamic system and programmed instructions stored in a memory and configured to calculate a recurrence quantification variable for each area or volume element and to display the calculated recurrence quantification analysis variables as a spatial distribution.

Additionally, the invention provides a computer program product for analyzing spatial distributions of time variable signals. The computer program product includes computer code configured to calculate a recurrence quantification variable for each area or volume element and to display the calculated recurrence quantification analysis variables as a spatial distribution. The computer code may be part of a computer system that also includes at least one storage medium (e.g., a hard drive, floppy disc, optical disc, CD ROM, tape, random access memory or cache) and a central processing unit (CPU), wherein the computer code is stored in the at least one storage medium.

BRIEF DESCRIPTION OF THE DRAWINGS

FIG. 11 shows a Pearson correlation matrix based on the mean determinism values calculated from plots of the distribution of recurrences within a topological cut-off distance of 20% of the maximum topological distance for the images of FIGS. 7-10.

FIG. 13 shows a Pearson correlation matrix based on the mean determinism values calculated from plots of the distribution of recurrences over the entire range of topological distances for the images of FIGS. 7-10.

FIG. 15 shows a Pearson cross-correlation matrix for the data shown in the correlation matrices of FIGS. 11 and 13.

FIGS. 19a-19j show the spatial distribution for each RQA variable calculated from the recurrence plots of FIGS. 18a-18j.

FIGS. 23a and 22b show the auto-recurrence plot based on time-series 3a and 3b of FIGS. 22a and 22b, respectively.

DETAILED DESCRIPTION

Figure 1:
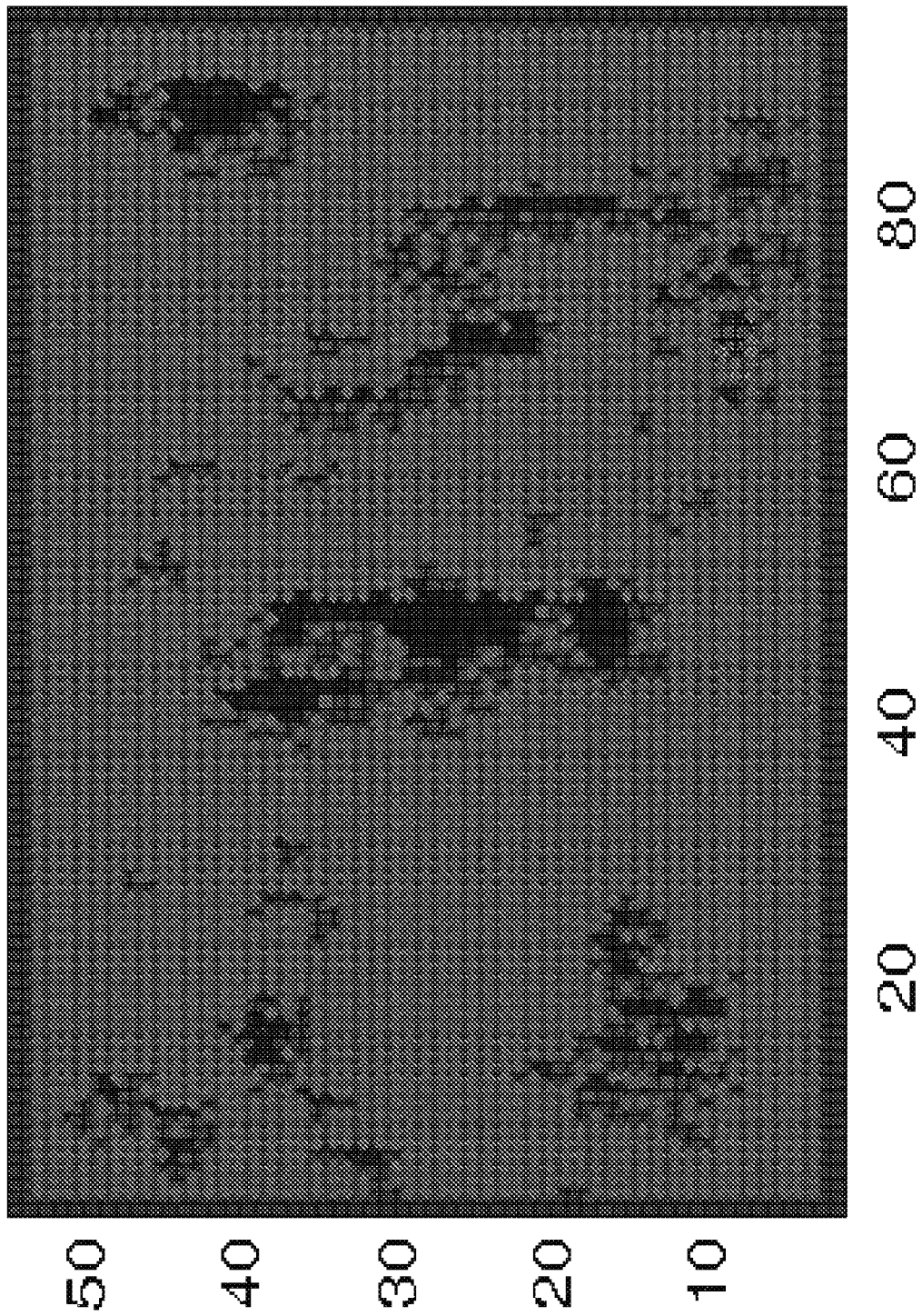
FIG. 1 shows a digital image obtained by 2D gel electrophoresis.

Quantitative Analysis of Digital Images:

A method for quantifying digitized images for purposes of diagnosis, comparison and control is provided. Generally, the method employs an algorithm that provides a numerical quantification of recurrent and deterministic patterns present in digital images. The algorithm is a 2D extension of the RQA analysis of monodimensional numerical series and is based on a distance matrix of recurrent patterns obtained by: 1) windowing an image into a number of partially overlapping frames; 2) identifying recurrent and deterministic patterns in pairwise combinations of frames and 3) developing the matrix from those pairwise combinations that meet a selected (dis)similarity threshold. The algorithm works by scoring "recurrences" i.e. any patterns that appear in multiple copies in the image. The proportion of recurrences appearing in close vicinity with respect to the total number of recurrences gives a quantitative determination to the image linked to its texture properties.

The method may be applied to any digital image where an objective identification or classification of the image is desirable. Digital photographs are a type of digital image that may benefit from the methods provided herein. Such photographs include photographs used in the study, diagnosis and treatment of melanomas. Another class of digital images that may benefit from the methods provided herein are laboratory and clinical images including, but not limited to, magnetic resonance images, radiographs, computed tomography (CT) scans, ultrasound images, cineangiography images and digitized images from analytical assays, such as microarray (e.g. fluorescent microarray) and electrophoresis assays. The images may be colored images or black and white images.

The methods provided herein include the step of generating a distance matrix from the digital image. In an initial step in the process, each pixel in the digital image is assigned a value based on its color. For example, each pixel in a colored digital image may be assigned a numerical grey level value (typically between 0 and 255) based on the average of the red, green and blue channels for that pixel. However, other assignment schemes may also be employed. Next a first "value matrix" is defined by a window framing a plurality of pixels in the digital image, where the elements of the value matrix correspond to the values assigned to the framed pixels. A second value matrix is then defined by shifting the window by a set number of pixels over the digital image. This process is repeated, shifting the window in a vertical and/or horizontal direction, until the image has been divided into a plurality of overlapping value matrices.

The size and extent of overlap of the window may be selected arbitrarily by the user. However, the size of the window should be sufficiently small to allow a plurality of value matrices to be defined. Generally, a smaller window may provide better resolution. Unfortunately, a smaller window may also result in a higher noise level. Thus, the selection of window size will typically depend on the desired resolution of features in the digital image. Where a user is looking only for broad outlines in the image a larger window may be sufficient. On the other hand, where the user is looking for finer details, a smaller window may be more appropriate. The window is desirably, but not necessarily, a square window. Thus, for example, given a 640×480 pixel image, and an 11×11 pixel window, using horizontal and vertical sliding steps of 4 pixels, a total number of 132×117 windows will be defined. It should be understood that the preceding example is provided for purposes of illustration only and should not be interpreted as limiting the scope of this invention.

Using the steps outlined above, the entire digital image or only a portion of the digital image which is of interest to the user may be divided into a plurality of value matrices. For the purposes of this invention, both of these situations will be referred to generally as "dividing the digital image into a plurality of overlapping value matrices."

Next, one of the plurality of value matrices defined in the preceding step is selected as a reference matrix and a distance is calculated between the selected reference matrix and each of the other value matrices in the plurality of value matrices. The calculated distance may be a measure of the (dis)similarity of the elements in the reference matrix and the elements in the value matrix to which the reference matrix is being compared. In one embodiment, the distance is the Euclidean distance or the squared Euclidean distance between the matrices, although other measures of (dis)similarity may also be used. Many other measures of (dis)similarity are known. These other measures include, but are not limited to, various matrix norms, such as a min. norm, a max. norm, or a supremum norm. Still other suitable measures of matrix (dis)similarity include, but are not limited to, Manhattan distances, Mahalanobis distances, Minkowski distances, cosine distances, Jaccard distances and Chebychev distances.

By way of example, the distances may be calculated sequentially as follows: a first reference matrix may be selected as the value matrix defined by a window framing the pixels in the upper left hand corner of the digital image. This reference matrix may be compared to the value matrix that is defined when the window is shifted a set number of pixels to the right to obtain a first distance. The reference matrix may then be compared to the value matrix that is defined when the window is shifted again by a set number of pixels to the right to obtain a second distance. This process is repeated until a distance has been calculated between the first reference matrix and each of the other value matrices into which the digital image is divided. The distances so calculated then become the elements in a row (or column) of a "distance matrix." For example, the first distance may become the first element in the row (or column), the second distance may be become the second element in the row (or column), and so on until the number of elements in the row (or column) is equal to the total number of overlapping value matrices in the plurality of value matrices. Thus, in the example used above, the number of elements in the row (or column) will be 132×117.

The process described in the preceding paragraph is then repeated for a second selected reference matrix to provide a second row (or column) in the distance matrix. This step is repeated until each value matrix in the plurality of value matrices has been selected as the reference matrix and a square distance matrix has been generated.

A "local recurrence value" may now be calculated for each row (or column) in the distance matrix. The local recurrence value is a measure of the fraction of elements in that row (or column) having a distance within a selected cut-off distance. The distances corresponding to these elements are considered recurrences. Clearly, if there is zero distance between two elements, they are recurrent. The cut-off is used because in real images, elements may not be exactly recurrent due to variance or errors in taking measurements and generating images. For these situations the selection of a pre-determined cut-off distance provides for a degree of tolerance. For example, if the distance matrix is a dissimilarity distance matrix, the local recurrence value may be a measure of the fraction of elements in that row (or column) having a dissimilarity distance no greater than some fraction of the maximum (or mean or average) value of the distances in that row (or column). However, it should be understood that other cut-off criterion may be used.

A "global recurrence value" may then be calculated for the digital image based on the local recurrence values for the rows (or columns) of the distance matrix. In some embodiments, the global recurrence value is calculated as the mean or median of the local recurrence values for the rows (or columns) in the distance matrix. This global recurrence value provides a measure of the percentage of the distance matrix that is composed of recurrences and may be thought of as analogous to the "% REC" parameter in the RQA analysis of monodimensional signals.

Optionally, a recurrence plot may be generated from the distance matrix by identifying the recurrences in the distance matrix as those matrix elements having a distance within selected cut-off distance and generating a dot array from those elements. Again, the cut-off distance may be selected such that only those elements having a distance no greater than some fraction of a maximum (or mean or average) value are considered recurrent, although different cut-off criterion may be used. The dot array has the same dimensions as the distance matrix and each position in the array corresponds to an element in the distance matrix. For each recurrence in the distance array, a dot having a size, intensity and/or color related to its distance value is placed at the corresponding position in the dot array. A blank is left in the array for each non-recurrence in the distance matrix. It should be noted that although information about the topological distance between recurrent patterns in the original image is embedded in the recurrence plot, that information will not be immediately evident from the plot.

Once the recurrences in the distance matrix have been identified, "percentage of determinism" may be calculated for the distance matrix. The percentage of determinism is the percentage of recurrences that appear in topologically nearby areas as determined by a selected topological cut-off distance. This may be visualized by generating a plot of (dis)similarity distance versus topological distance for each recurrence in the distance matrix, wherein topological distance is simply the topological distance in the digital image between the two matrices corresponding to the recurrence. A threshold value may be selected on the topological distance axis of such a plot and the fraction of all the recurrences that lie on or below this threshold provides a measure of the percentage of determinism.

Two other quantitative characteristics of a digital image that may be identified using the methods provided herein include the SRDP and the LRDP. The SRDP is a vector wherein each element is the sum of the recurrences in a region of a plot of (dis)similarity distance versus topological distance for a given digital image and each region is defined by one slice (i.e. section) of topological distances between the origin and a selected topological cut-off, where the topological distance axis of the plot has been dissected into a plurality of equally-sized slices between the origin and the topological cut-off. Similarly, the LRDP is a vector wherein each element is the sum of the recurrence distances in a region of a plot of (dis)similarity distance versus topological distance and each region is defined by one "slice" of topological distances between the origin and the maximum topological distance, where the topological distance axis of the plot has been dissected into a plurality of equally-sized slices between the origin and the maximum topological distance.

The quantitative characteristics of a digital image, such as determinism, that are derived using the methods provided herein may be used to compare and identify correlations between two or more different digital images. For example, the mean determinism and standard deviation for different pairs of images may be used to generate a correlation matrix, such as a Pearson correlation matrix, or to generate a scatterplot matrix. Other analytical techniques that may be used to compare digital images based on the quantitative characteristics identified using the methods provided herein include, but are not limited to, cluster analysis, principal component analysis, 2D FFT analysis, 2D wavelet analysis and densitometric profile analysis.

Devices for carrying out the methods provided herein are also provided. These devices include an interface for receiving a digital image and programmed instructions stored in a memory and configured to carry out the methods described above. The digital image may be received by the interface as a series of pulses representing individual bits of data. For example, each pixel in a digital image may be represented by three bytes of data (24 bits) corresponding to the three color channels in that pixel. These bits may then be transmitted to the interface in the form of electrical or light pulses. The programmed instructions then operate on the digital image (i.e. the bits of data) to carry out the methods for quantifying patterns in digital images provided herein.

In one embodiment of the invention the instructions for carrying out the methods provided herein are embedded in a computer program product. The computer program product includes computer code configured to quantify recurrent patterns in digital images in accordance with the methods provided herein.

Generation of Digital Images from Time Variable Signals:

Methods for identifying and imaging spatial distributions of time variable signals generated from dynamic systems are provided. In these methods a time variable signal is recorded for a plurality of area or volume elements of a dynamic system and RQA is used to calculate one or more RQA variables for each of the area or volume elements that define the system. The calculated RQA variables may then be used to generate a two or three dimensional image displaying the spatial distribution of the RQA variables. In some embodiments, the image will take the form of a digital image in the shape of the dynamic system.

The dynamic system may be any system of interest that undergoes a measurable change with time. The dynamic system may be characterized by a shape and an area or volume which may be broken down into a plurality of area or volume elements, each capable of generating a time variable signal. Thus, by using RQA analysis to analyze the signals generated from the different area or volume elements of the dynamic system a spatial picture of the time dependent changes in the system may be developed. In developing these pictures it is desirable, but not necessary, that the plurality of area or volume elements used to collect the time variable signals are spatially contiguous. Alternatively the area or volume elements may represent different spatially separated regions of the dynamic system.

The methods provided herein may be applied to any system having a spatial distribution of time variable signals that is of interest to a user. The methods are particularly well-suited for studies of dynamic systems whose underlying processes are endowed with complex and subtle dynamics. Examples of dynamic systems that may be studied using the present methods include both biological systems and non-biological systems. Specific examples of biological systems that may be studied include, but are not limited to, body parts and organs, such as brains, hearts, scheletric muscles, and the like. Specific examples of non-biological systems that may be studied in accordance with the present invention include, but are not limited to, geographical features or regions that emit a time variable signal (e.g. a signal detected by satellite) from a plurality of neighboring spatial districts. For example, the present methods may be used to study periodic oscillations in surface temperatures of oceans studied by satellite observations resolved in space and time.

Time variable signals that may be measured in accordance with the present invention include any signals generated from a dynamic system that tend to vary over time. In some instances the signal will be response signals generated in response to one or more internal or external stimulating signals applied to the system. Examples of some time variable signals that may be advantageously studied using the present techniques include brain activity signals. Other signals that may be studied using the techniques presented here include, but are not limited to, spectroscopic signals (e.g., infrared (IR) signals, electron paramagnetic resonance (EPR), visible light, and ultraviolet (UV) signals) and electrophysiological records (e.g., patch clamp and oxygen consumption).

Brain activity signals as measured by functional magnetic resonance imaging provide a specific example of time variable signals that may be studied using the methods of the present invention. MRI studies of the brain are well known for their ability to provide structural information. More recently with the advent of functional MRI it has become possible to modify conventional magnetic resonance scanners to study brain activity as well. Brain activity may be monitored through indirect measurements of oxygen-related metabolic events in different parts of the brain.

To obtain functional MRI signals, a magnetic resonance scanner may be tuned to image hydrogen atoms as in a conventional MRI. However, in functional MRI studies T2*-weighted signals are collected in order to take advantage of the fact that deoxygenated hemoglobin is magnetic where as oxygenated hemoglobin is not. The magnetic properties of the unflipped magnetic deoxyhemoglobin molecules cause rapid dephasing which results in the T2* signal being retained longer in regions having more oxygenated blood than those having less oxygenated blood. In regions where a brain is activated, arterial oxygenated blood will redistribute and increase, causing that region to produce a more intense T2*-weighted signal. Thus, by studying the time variable signals from fMRI images of a brain, brain activity can be identified and imaged. This type of brain activity study is known as a blood oxygen level dependent (BOLD) study. Using functional MRI, brain activity related to various processes, including language, vision, movement, hearing and memory may be studied. Other time variable signals that may be analyzed using the present methods include functional magnetic resonance signals from dynamic susceptibility contrast (DSC) studies, intravenous bolus tracking studies and arterial spin labeling studies.

In carrying out the present methods a dynamic system is first sectioned into a plurality of area or volume elements. A time variable signal of interest is collected for each area or volume element in the system. Optionally, a temporal line detrending and a spatial smoothing may be applied to the collected signals in relation to the neighboring volume elements. Once the time variable signals have been acquired, RQA is conducted to obtain one or more relevant RQA variables for each area or volume element. RQA of time variable signals is known and has been described in the literature. For example, descriptions of RQA applied to various dynamic systems may be found in Zbilut, et al., *Phys. Lett. A.,* 171, 199-203 (1992); Webber, et al., *Modeling in Physiology,* 965-973 (1994); Marwan et al, *Phys. Rev. E.,* 66, 026702-1 through 8 (2002); and Zbilut et al., *Med. Engineer. & Phys.,* 24, 53-60 (2002), the entire disclosures of which are incorporated herein by reference. Briefly, RQA may be carried out on the time variable signals collected from the area or volume elements of a dynamic system as follows. First a recurrence plot is calculated for the area or volume element. Recurrence plots are known to be useful tools in the assessment of dynamic time series. The idea behind a recurrence plot is that after choosing an embedding, dots are plotted (i,j) on an N×N array whenever point x(j) is sufficiently close to point x(i) of an orbit for a given embedding and delay. More specifically, given a scalar time series $\{x(i)=1, 2, 3 \ldots \}$ an embedding procedure will form a vector, $X_i=(x(i), x(i+L), \ldots, x(i+(m-1)L))$ where m is the embedding dimension and L is the lag. $\{X_i=1, 2, 3 \ldots, N\}$ represents the multidimensional process of the time series of a trajectory in m-dimensional space. Recurrence plots are then symmetrical N×N arrays in which a point is placed at (i,j), whenever a point $X_i$ on a trajectory is close enough to another point $X_j$. The closeness between $X_i$ and $X_j$ is expressed by calculating a distance between the two normed vectors. Thus those dots that appear in the recurrence plat represent two vectors that are considered to be recurrent.

Because graphical representations of recurrent patterns may be difficult to evaluate, RQA was further developed to provide quantitative variables generated from the recurrence plots. Many such variables are known and described in detail in the references cited in the preceding paragraph. Therefore, only a brief description of these variables is provided here. The percent recurrence (REC) is one RQA variable. REC provides a measure of the percentage of the recurrence plot that is filled with recurrent points. The percent of determinism (DET) is another RQA variable. DET represent the percentage of recurrent points in a recurrence plot that form diagonal lines, with a minimum of two adjacent points. This is significant because recurrent points which form a diagonal line segment are considered to be deterministic, as distinguished from random. Another RQA variable that may be derived from the recurrence plots is entropy (ENT) which is the Shannon information entropy of the line length distribution in the recurrence plot. The length of longest line segment (MAXLINE) in the recurrence plot is another RQA variable that may be calculated from the recurrence plots. Similarly, MEANLINE is the mean length of the line segments in a recurrence plot. Laminarity (LAM) represents the ratio between the recurrence points forming vertical structures in the recurrence plot and the entire set of recurrence points. LAM provides a measure of the number of vertical structures in the recurrence plot and represents the occurrence of Laminar states in the system but does not provide information regarding the length of these Laminar structures. The average length of the vertical structures in the recurrence plot is known as the trapping time (TRAPT). The time distance between a state of a system at time i and at its recurrence at time j (i.e., "RECUTIME1") may be measured by vertical distances of the line segments in a recurrence plot. Discarding the states at time j−1 (sojourn times) leads to recurrence times of a second type (i.e., "RECUTIME2").

Once one or more RQA variables have been calculated for the area or volume elements of the dynamic system, the spatial distribution of the one or more variables may be analyzed. The spatial distribution may be represented by an image that reflects the shape of the dynamic system. This image, which may be a two dimensional or a three dimensional image, provides the observer with information regarding the spatial distribution of system dynamics. For example the image may take the form of a digital image showing a cross section of a dynamic system, such as a human brain, wherein each pixel that makes up the digital image has a shading (color or black or white) that is related to the value of the RQA variable for that pixel. Alternatively the image may be a three dimensional digital image of the dynamic system wherein each voxel that makes up the image has a shading that relates to the value of the RQA variable in that voxel.

The present methods may be used to determine the correlation of a spatial distribution of time variable signals with itself over successive time intervals by calculating the auto-correlations between the signals measured over the successive time intervals. The present methods may also be used to determine the similarity between the spatial distributions of time variable signals measured under different conditions by calculating the cross correlations between the signals measured under the different conditions. For example, when the two axes of the recurrence plot represent an external reference function and the response signals, respectively, the matrix will be representative of cross-recurrences.

Exemplary embodiments of the present methods for analyzing digital images and for identifying and imaging spatial distributions of time variable signals are provided in the following examples. These examples are presented to illustrate the methods and to assist one of ordinary skill in using the same. These examples are not intended in any way to otherwise limit the scope of the invention.

EXAMPLES

Example 1

Characterization of a Digital Image Obtained by 2D Gel Electrophoresis

FIG. 1 shows a digital image obtained by 2D gel electrophoresis of proteins obtained from a cell. This image represents a typical digital image that may be obtained in a proteomics experiment. The digital image had dimensions of 55×96 pixels and is referred to as "R1" for the purposes of this disclosure. A window size of 5×5 pixels and a window step size of 1 pixel was used to generate a distance matrix for the digital image.

Figure 2:
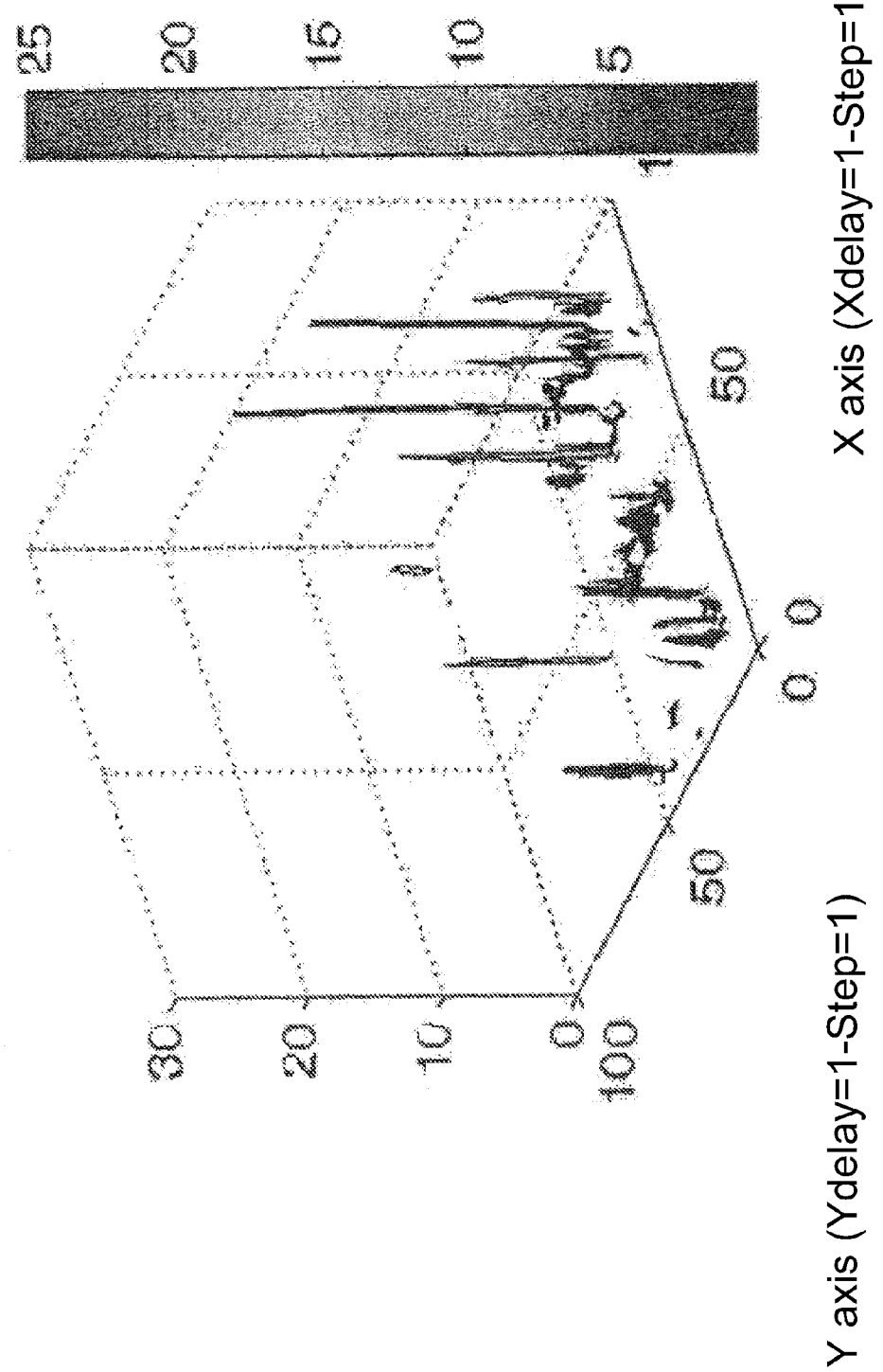
FIG. 2 shows a three dimensional plot of some recurrences for the digital image of FIG. 1 calculated based on a first selected reference window.
Figure 3:
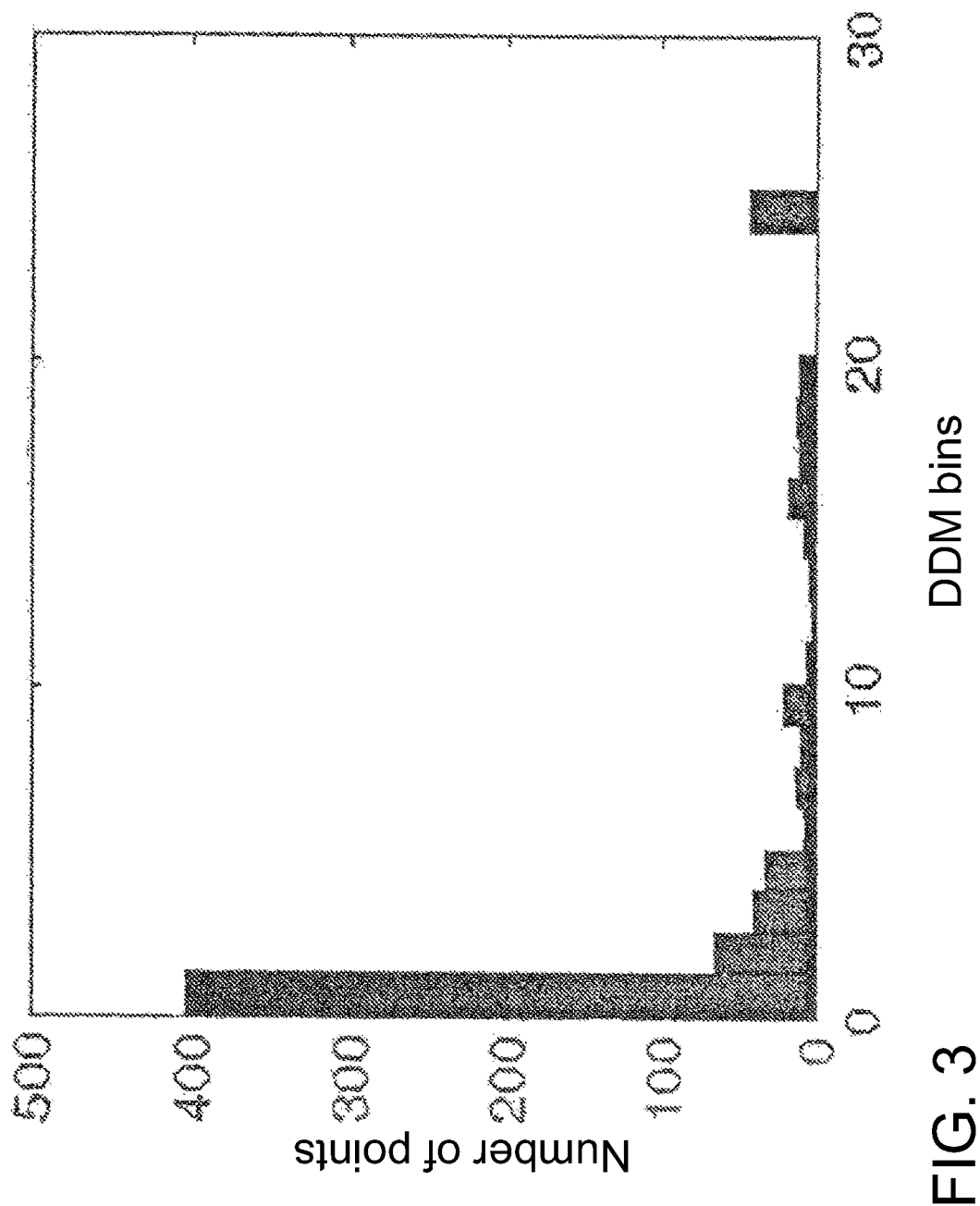
FIG. 3 shows the distribution of the recurrences of FIG. 2 as a function of dissimilarity distance.
Figure 4:
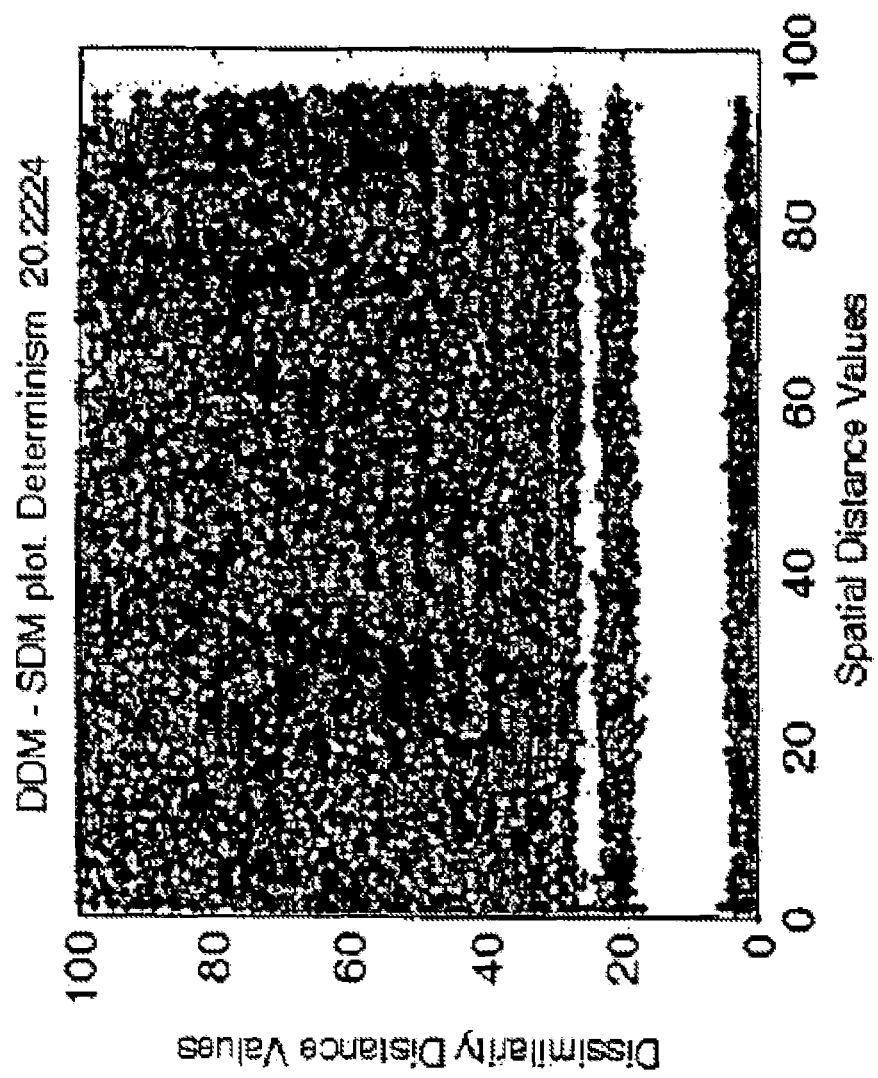
FIG. 4 shows a plot of dissimilarity versus spatial (i.e. topological) distance for each of the elements in a distance matrix derived from the digital image of FIG. 1.

Euclidean distances were calculated to generate a dissimilarity distance matrix. The matrix was normalized to maximum dissimilarity distance of 100 and a dissimilarity distance cut-off of 30 was used to identify recurrences in that matrix. FIG. 2 shows a three dimensional plot of the recurrences calculated based on a first selected reference window. The distribution of the recurrent values as a function of dissimilarity distance is shown in FIG. 3 for the same data. FIG. 4 shows a plot of dissimilarity versus spatial (i.e. topological) distance for each of the elements in the distance matrix.

Figure 5:
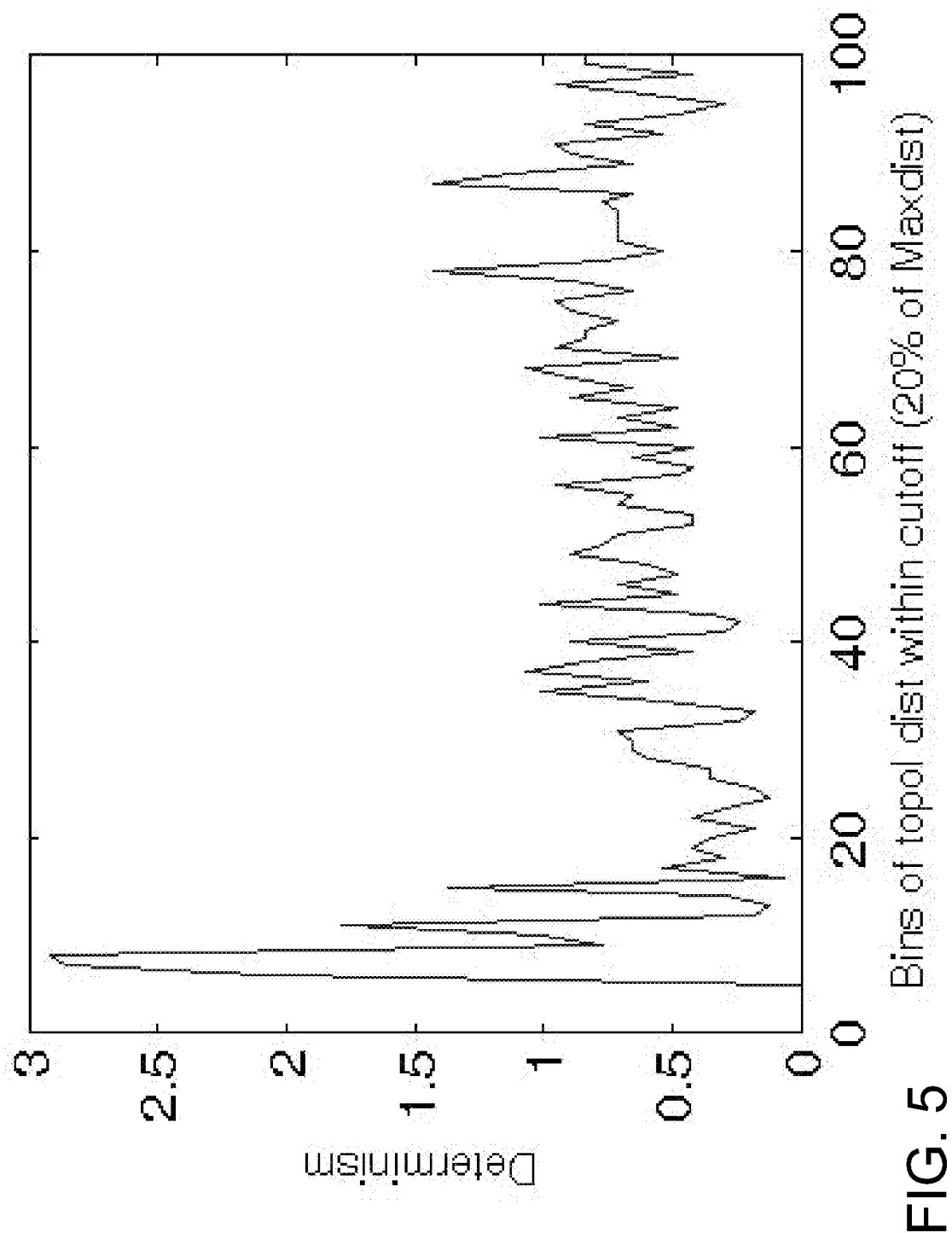
FIG. 5 shows a plot of the distribution of the recurrences in FIG. 4 that lie within a topological cut-off (WTC) distance of 20% of the maximum topological distance.
Figure 6:
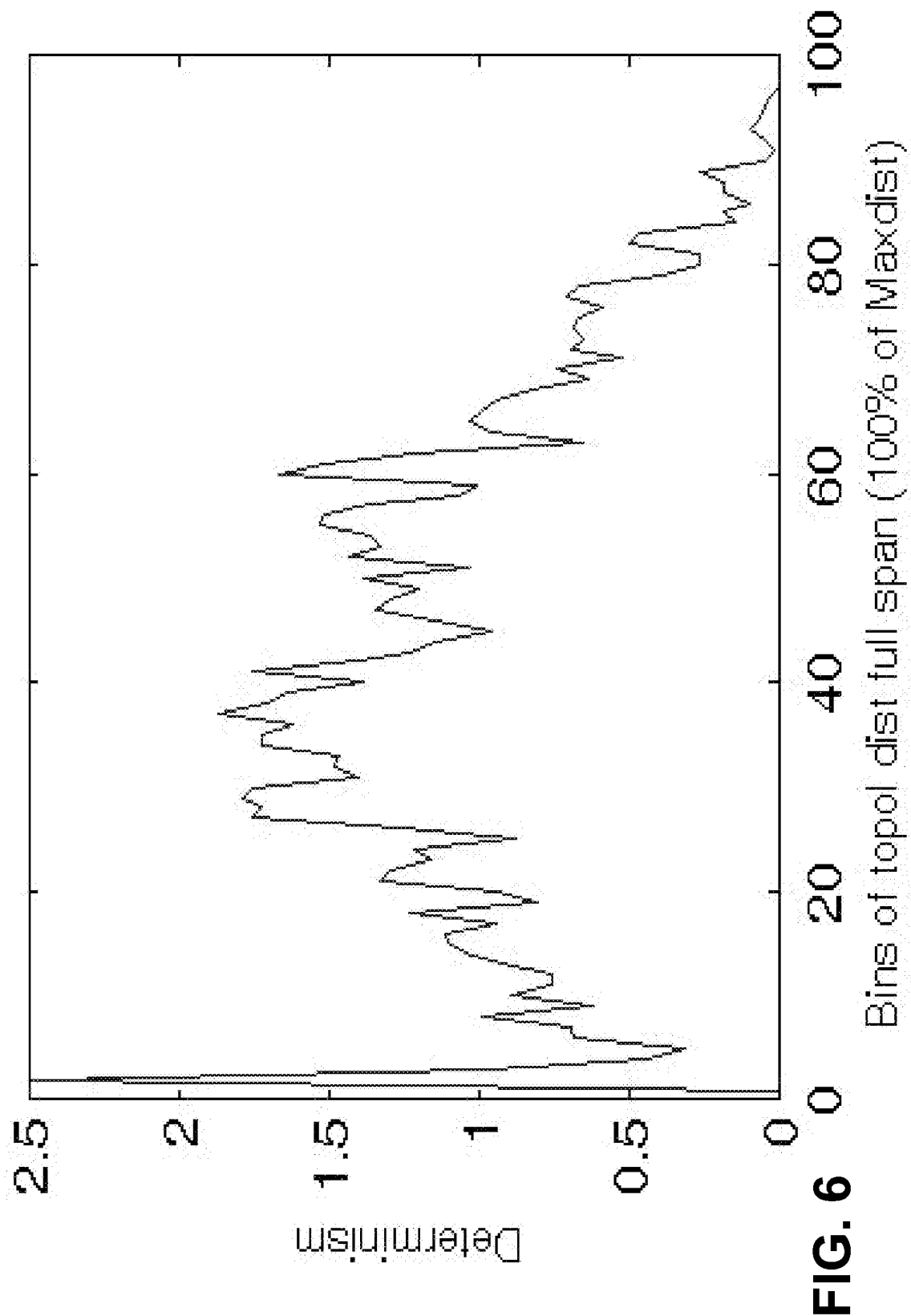
FIG. 6 shows a plot of the distribution of the recurrences in FIG. 4 over all (normalized) topological distances (ATD).
Figure 7:
FIG. 7 shows a first surrogate digital image derived from the digital image of FIG. 1.
Figure 8:
FIG. 8 shows a second surrogate digital image derived from the digital image of FIG. 1.
Figure 9:
FIG. 9 shows a third surrogate digital image derived from the digital image of FIG. 1.
Figure 10:
FIG. 10 shows a fourth surrogate digital image derived from the digital image of FIG. 1.

A closer look at the recurrences is provided in FIG. 5 which shows a plot of the distribution of recurrences within a topological cut-off distance of 20% of the maximum topological distance. Specifically, the plot shows the sum of the (normalized) recurrences as a function of topological distance over a range of normalized topological distances up to the topological cut-off distance. For the purposes of this disclosure the abbreviation "WTC" will be used to designate a measurement taken "within a topological cut-off." The sums were calculated by dividing the selected topological distance range into 100 bins (or slices) and calculating the total for each bin. A mean determinism value of 0.843 was derived from the plot of FIG. 5 (i.e., the mean determinism value for R1WTC was 0.843). FIG. 6 provides a longer range look at the distribution of recurrences over the entire (normalized) range of topological distances. Here, the plot shows the (normalized) sum of recurrences for a given topological distance over the entire (normalized) range of topological distances. For the purposes of this disclosure the abbreviation "ATD" will be used to designate a measurement taken over "all topological distances." The sums were calculated by dividing the entire topological distance range into 100 bins (or slices) and calculating the total for each bin. A mean determinism value of 0.968 was derived from the plot of FIG. 6 (i.e., the mean determinism value for R1ATD was 0.968).

Example 2

Quantitative Comparison of Digital Images Obtained by 2D Gel Electrophoresis

Figure 12:
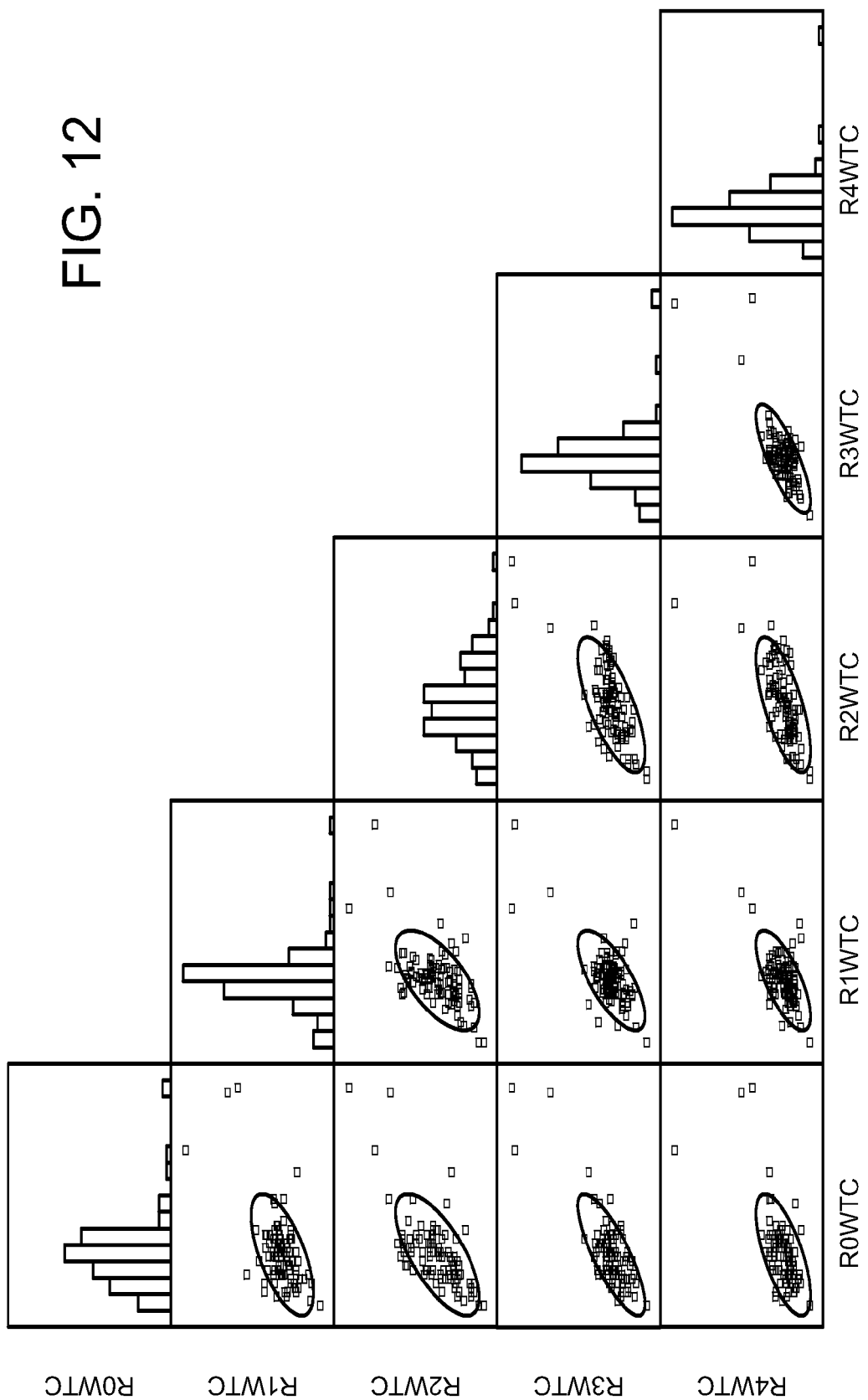
FIG. 12 shows a scatterplot matrix based on the dissimilarity distance values of the recurrences within a topological cut-off distance of 20% of the maximum topological distance for the images of FIGS. 7-10.
Figure 14:
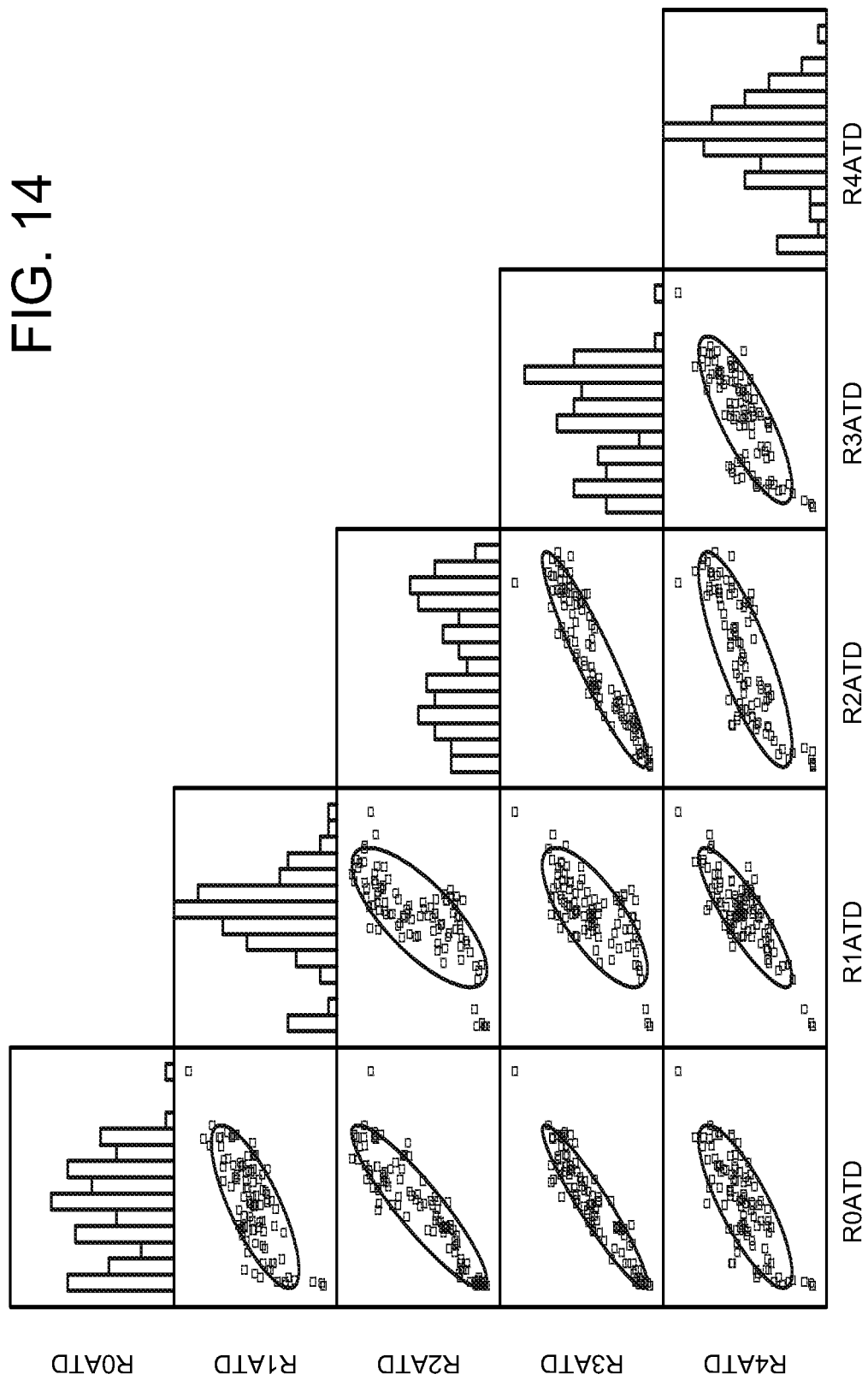
FIG. 14 shows a scatterplot matrix based on the dissimilarity distance values of the recurrences over the entire range of topological distances for the images of FIGS. 7-10.

In order to provide a quantitative comparison between different figures, the digital image shown in FIG. 1 was modified by randomly varying the intensity and location of spots to give rise to four surrogate images, shown in FIGS. 7-10. These images are referred to as R0, R2, R3 and R4, respectively, for the purposes of this disclosure. For each of these images a plot of the distribution of recurrences within a topological cut-off distance of 20% of the maximum topological distance was calculated, as described above. A mean determinism value was then calculated for each plot. The mean determinism values for R0, R2, R3 and R4 WTC were 0.683, 0.813, 0.828 and 0.824, respectively. The calculated recurrences and their mean values were used to generate a Pearson correlation matrix and a scatterplot matrix. These matrices are shown in FIGS. 11 and 12, respectively. Similarly, a plot of the distribution of recurrences over the entire (normalized) range of topological distances was calculated as described above. Again, a mean determinism value was then derived from each plot. The mean determinism values for R0, R2, R3 and R4 ATD were 0.918, 0.960, 0.962 and 0.963, respectively. The calculated recurrences and their mean values were used to generate a Pearson correlation matrix and a scatterplot matrix. These matrices are shown in FIGS. 13 and 14, respectively.

Figure 16:
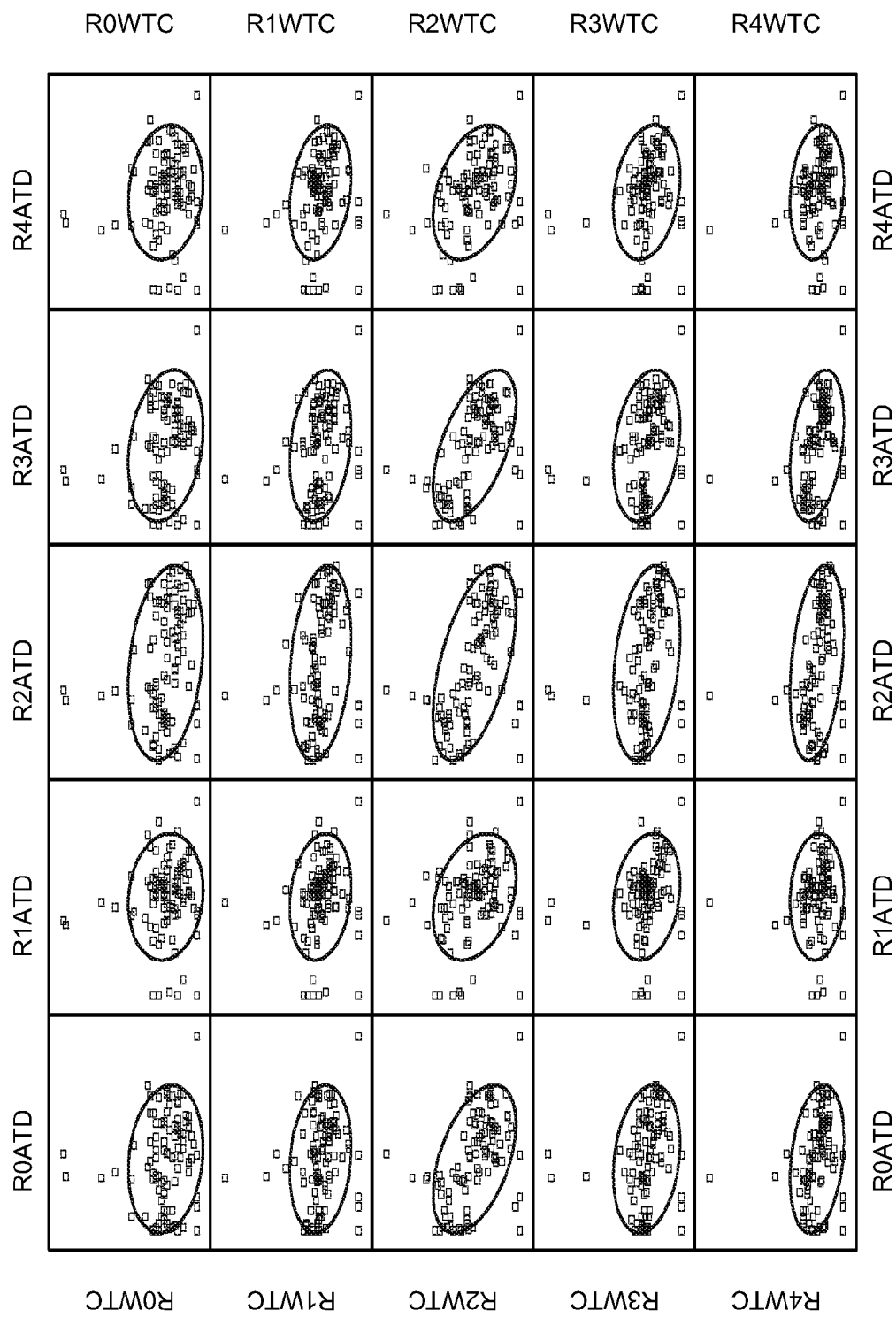
FIG. 16 shows a scatterplot cross-correlation matrix for the data shown in the scatterplot matrices of FIGS. 12 and 14.

Finally, a Pearson cross-correlation matrix and a scatterplot cross-correlation matrix were generated to identify correlations between the distribution of recurrences within a topological cut-off distance of 20% of the maximum topological distance and the distribution of recurrences over all of topological distances. These matrices are presented in FIGS. 15 and 16.

Example 3

Figure 17A:
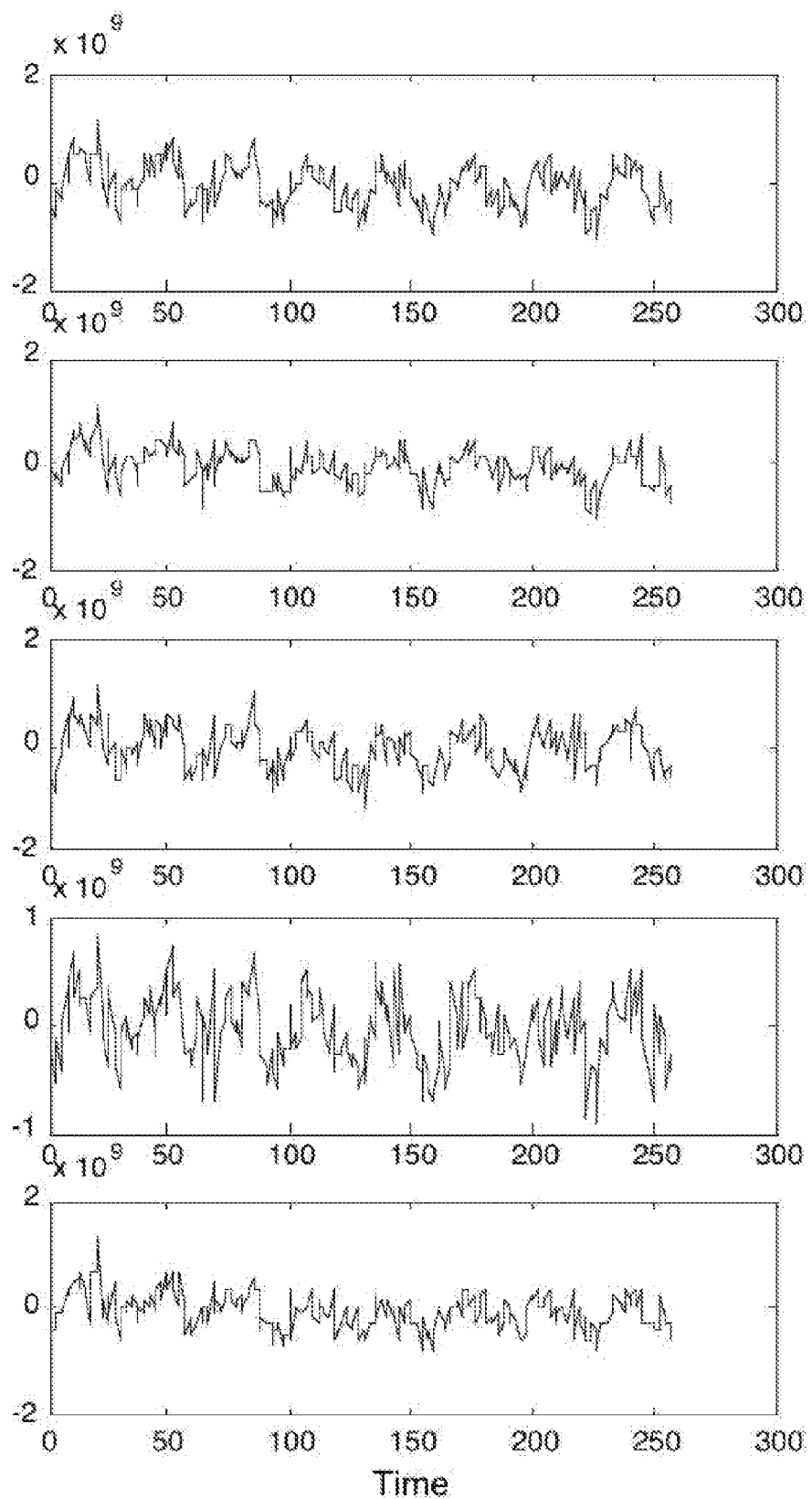
FIGS. 17a and 17b show magnetic resonance signals collected from five contiguous voxels of (a) activated and (b) non-activated regions of subject's brain.
Figure 17B:
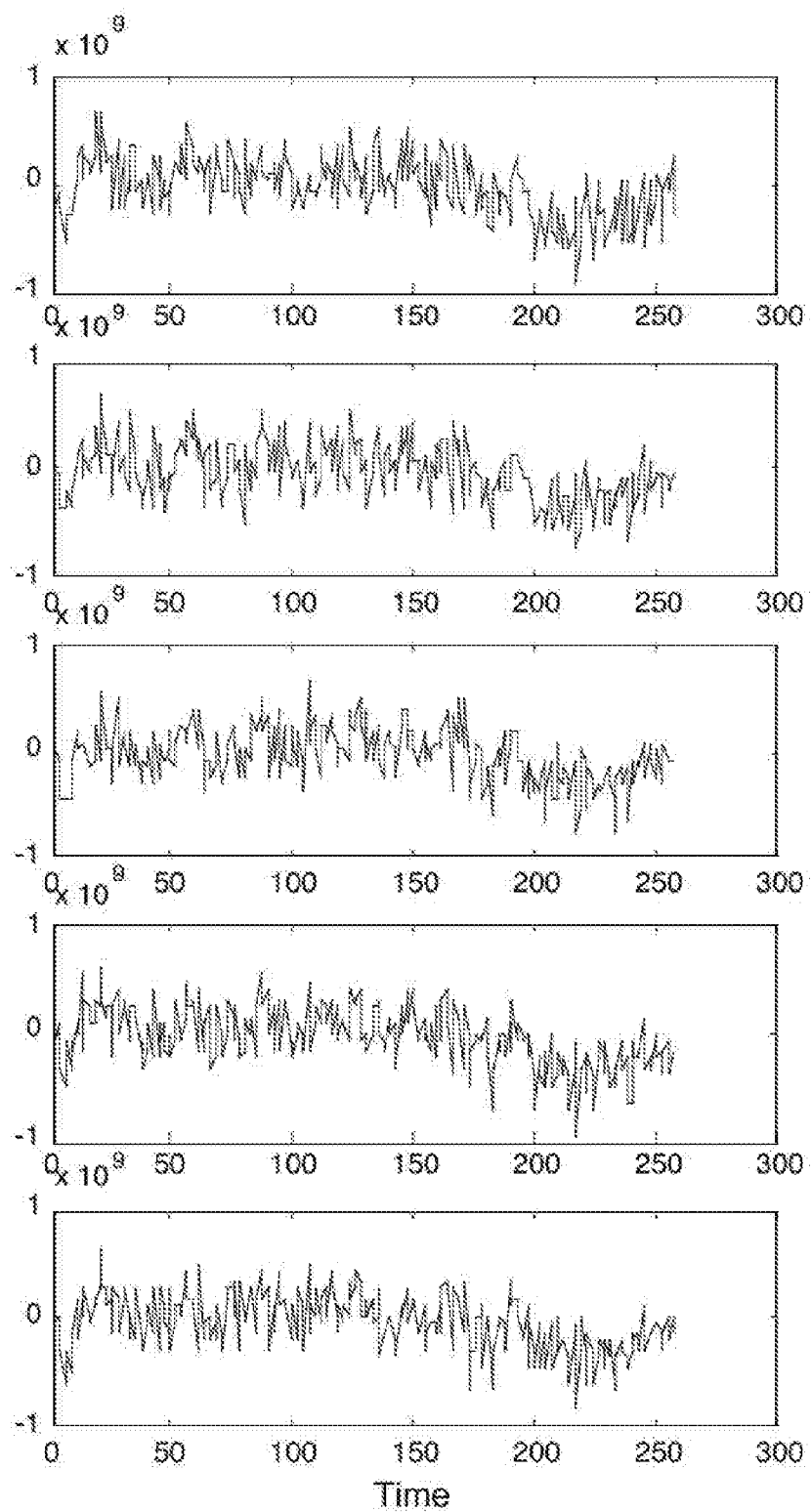
Figure 18A:
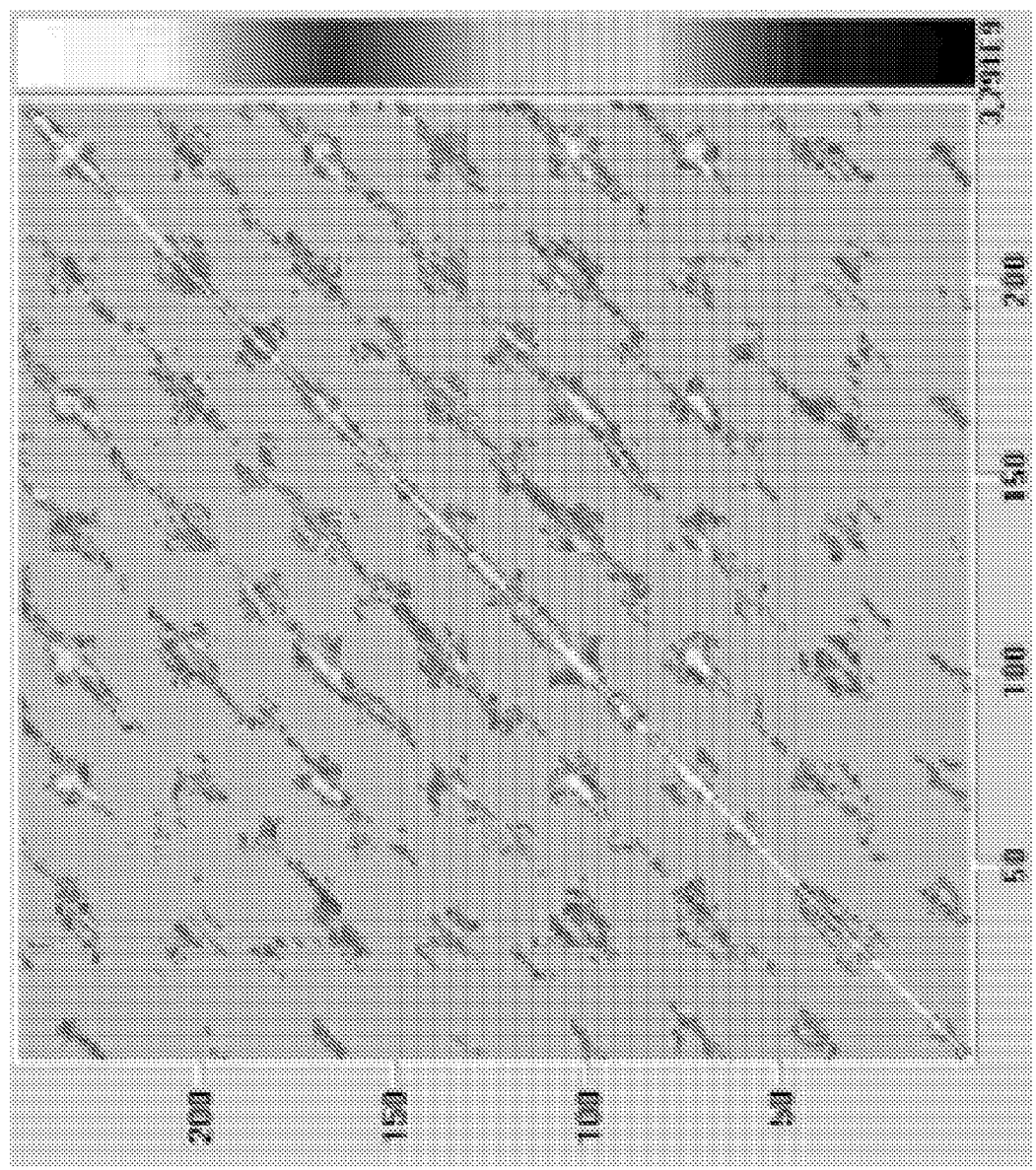
FIGS. 18a-18j show the recurrence plots generated from the voxels of FIGS. 17a and 17b.
Figure 18B:
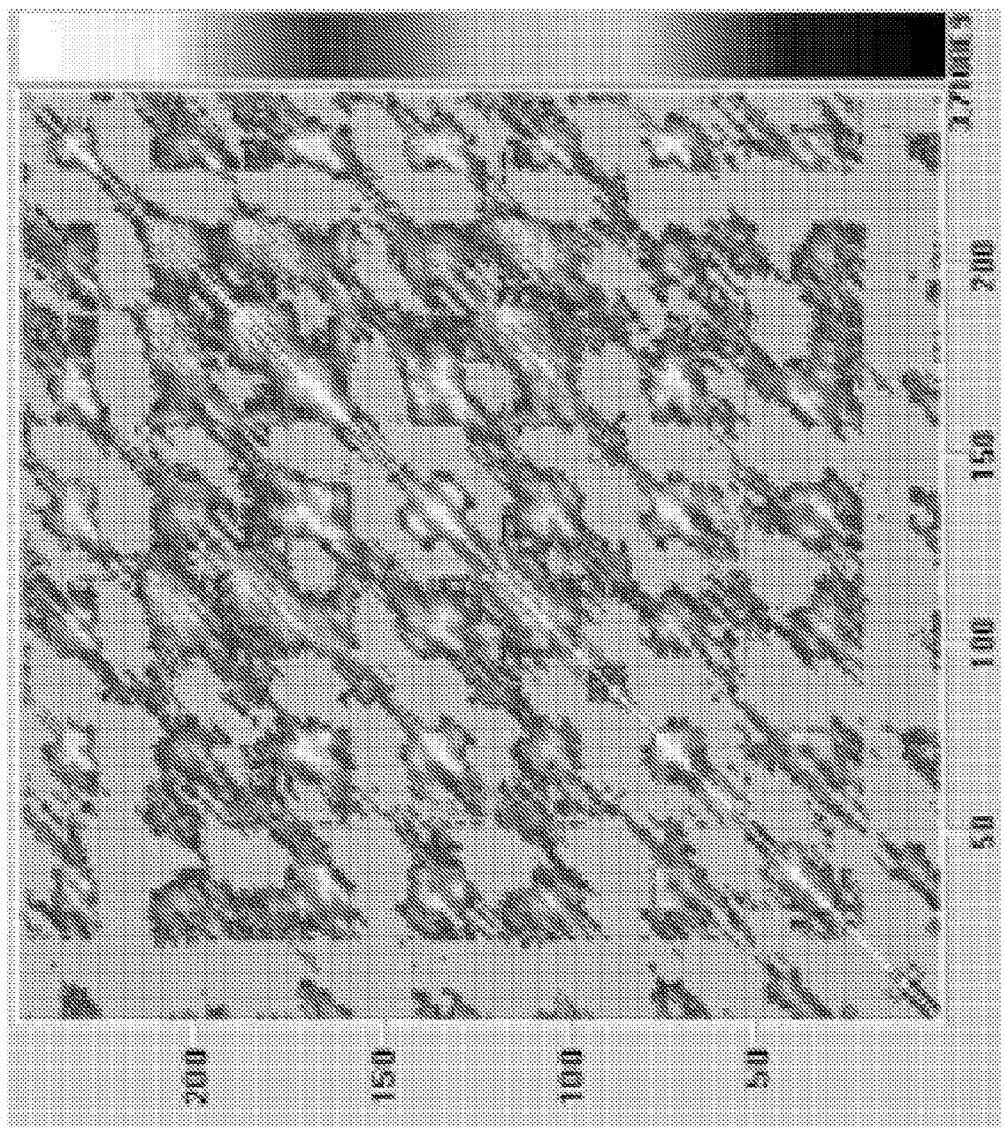
Figure 18C:
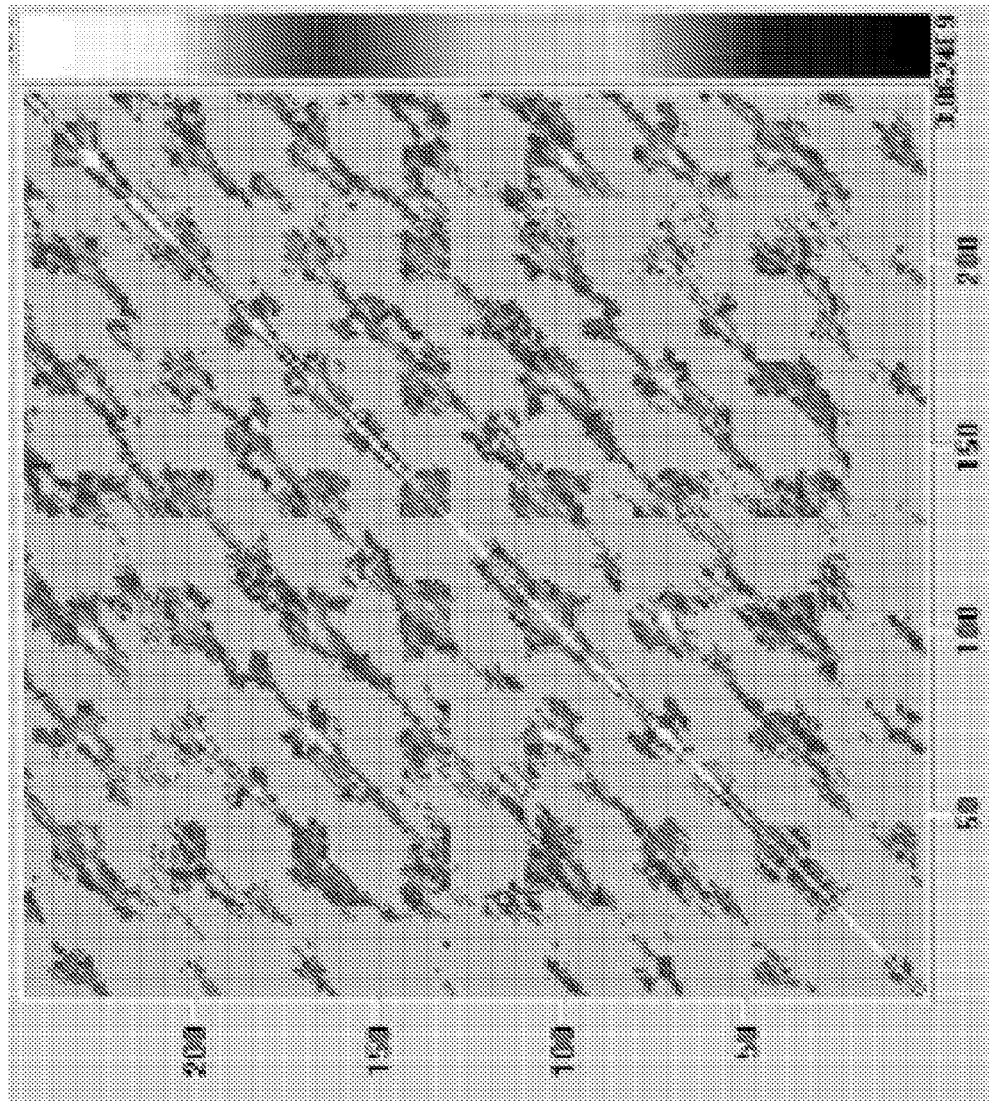
Figure 18D:
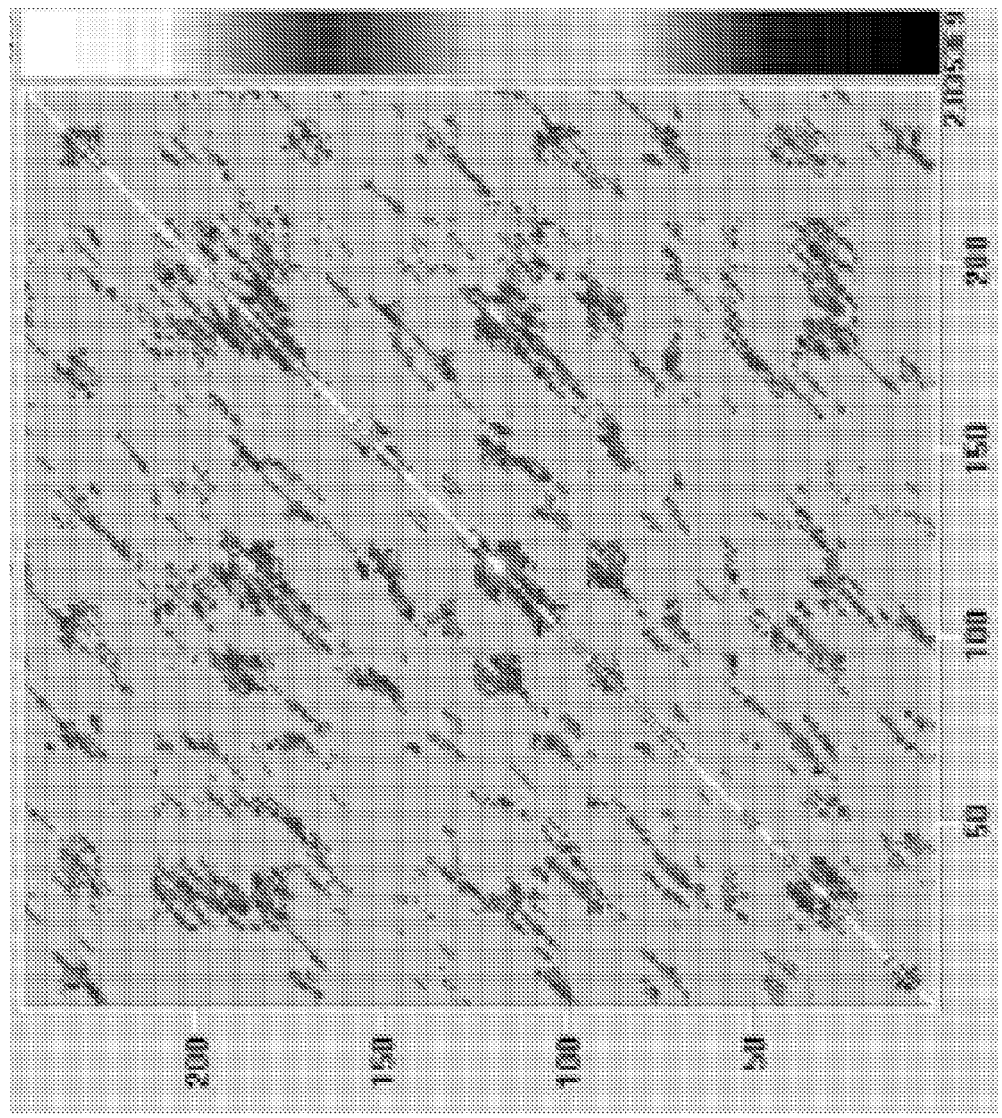
Figure 18E:
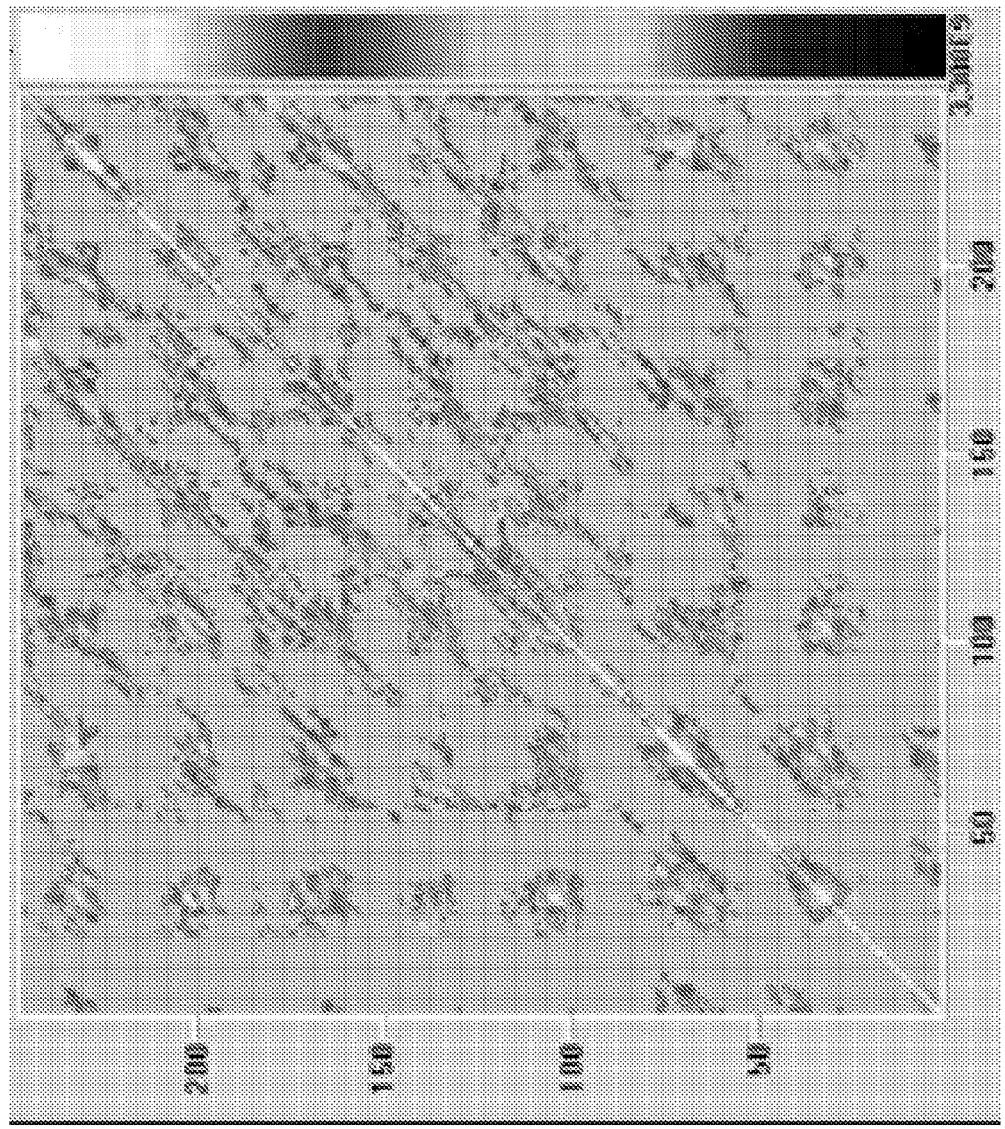
Figure 18F:
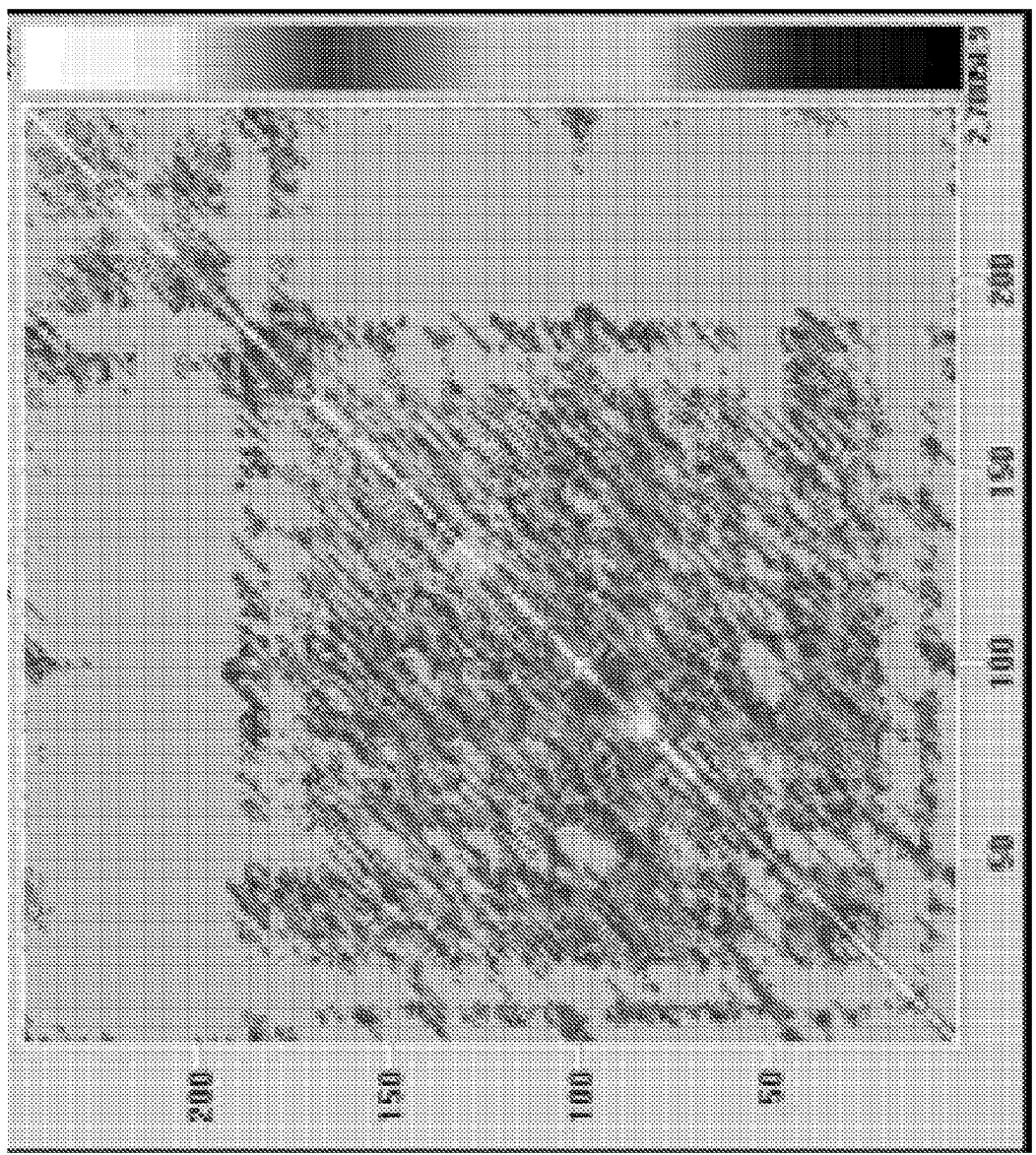
Figure 18G:
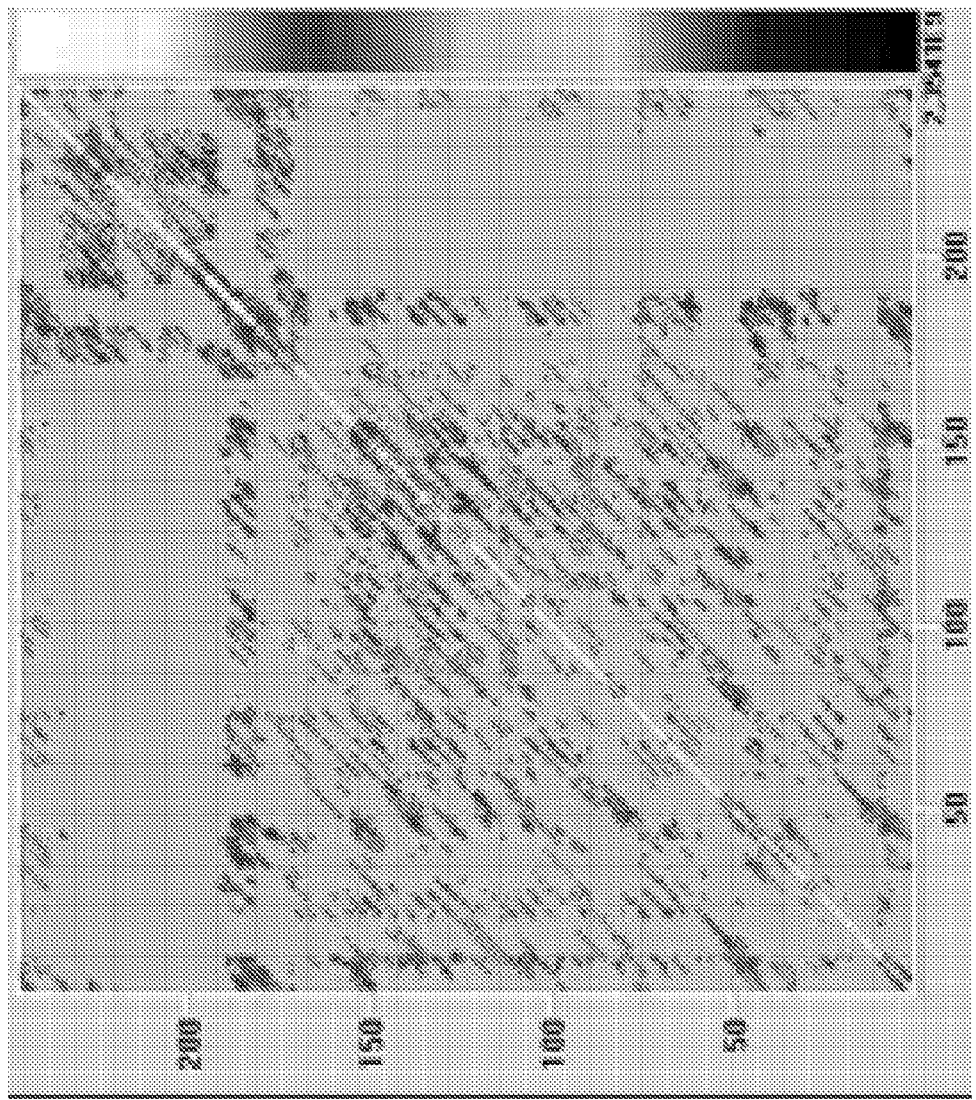
Figure 18H:
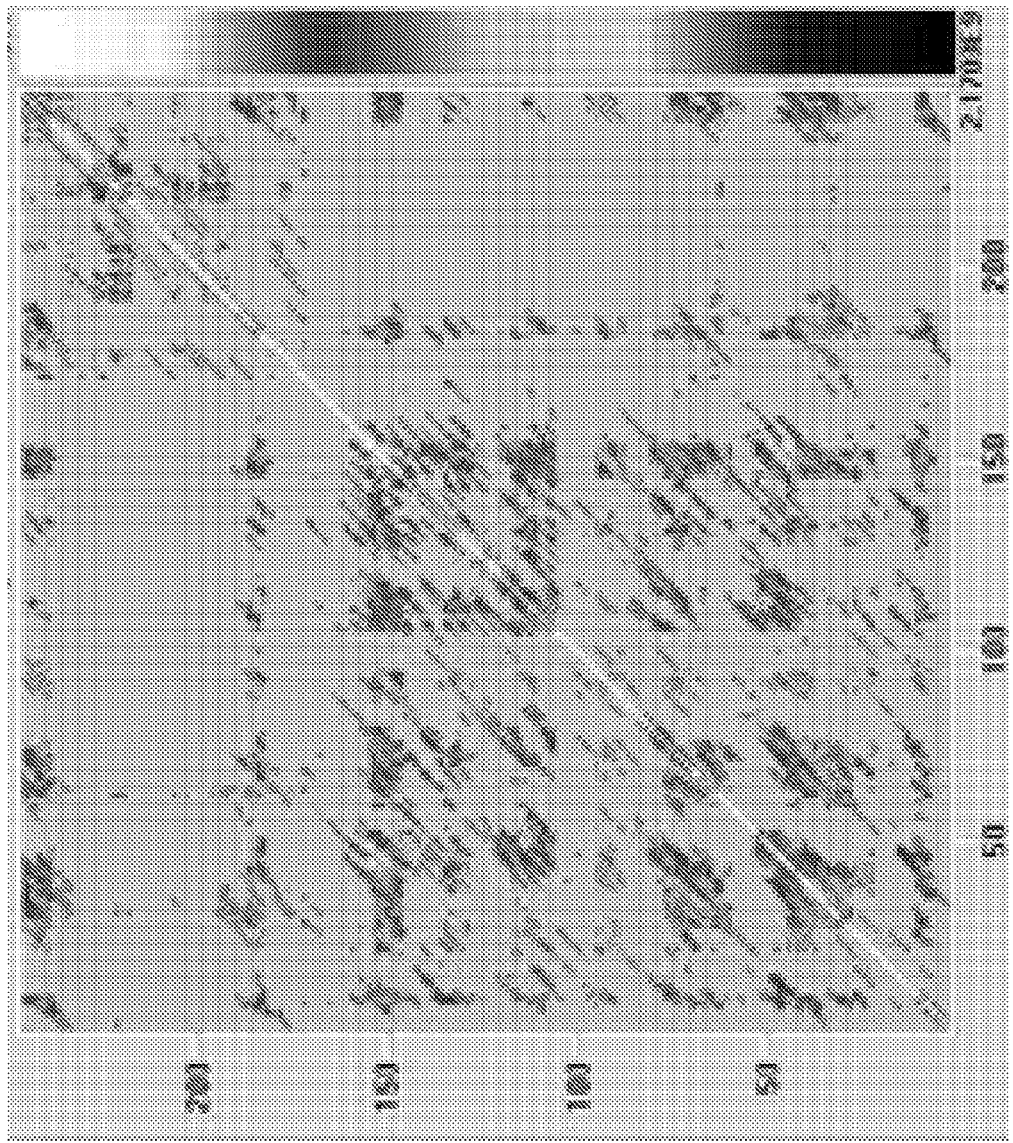
Figure 18I:
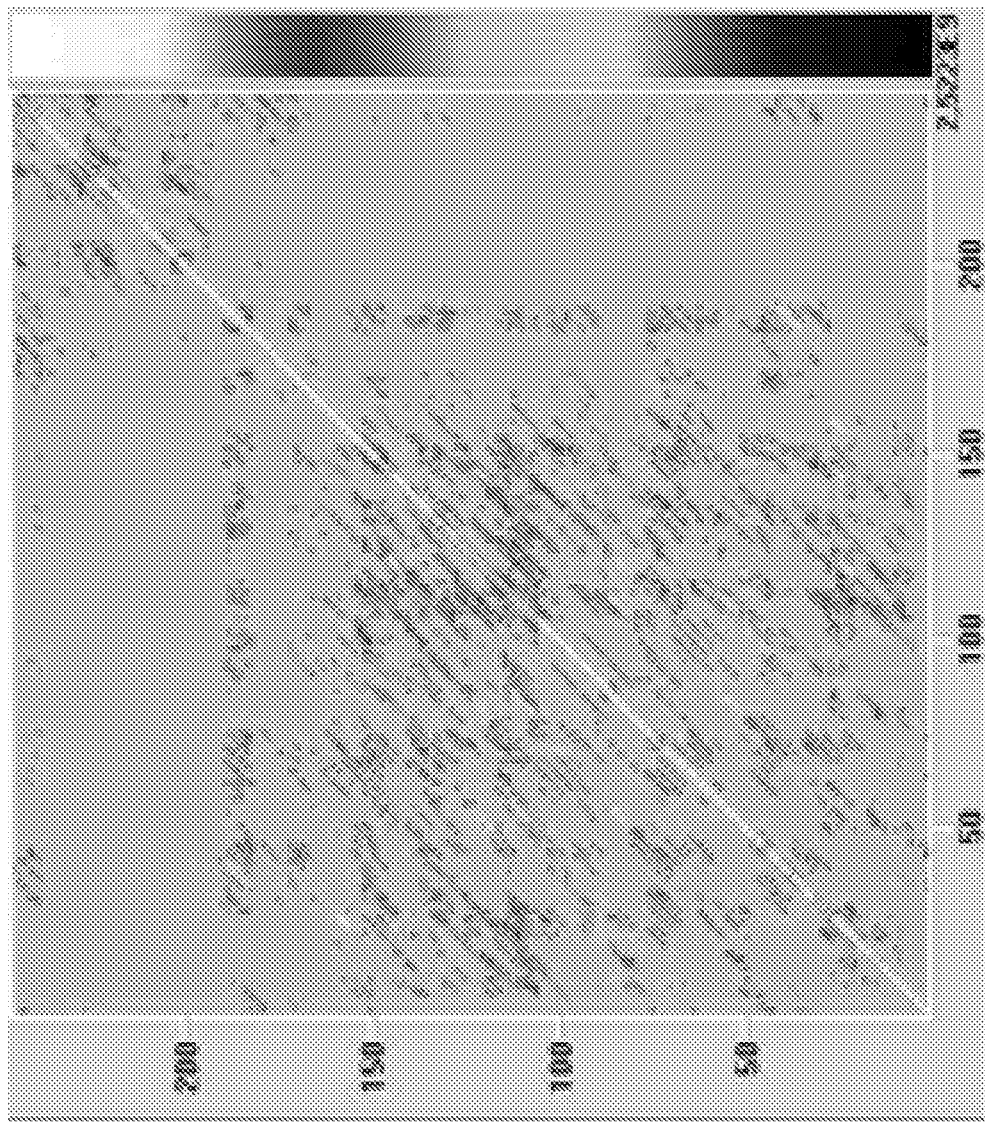
Figure 18J:
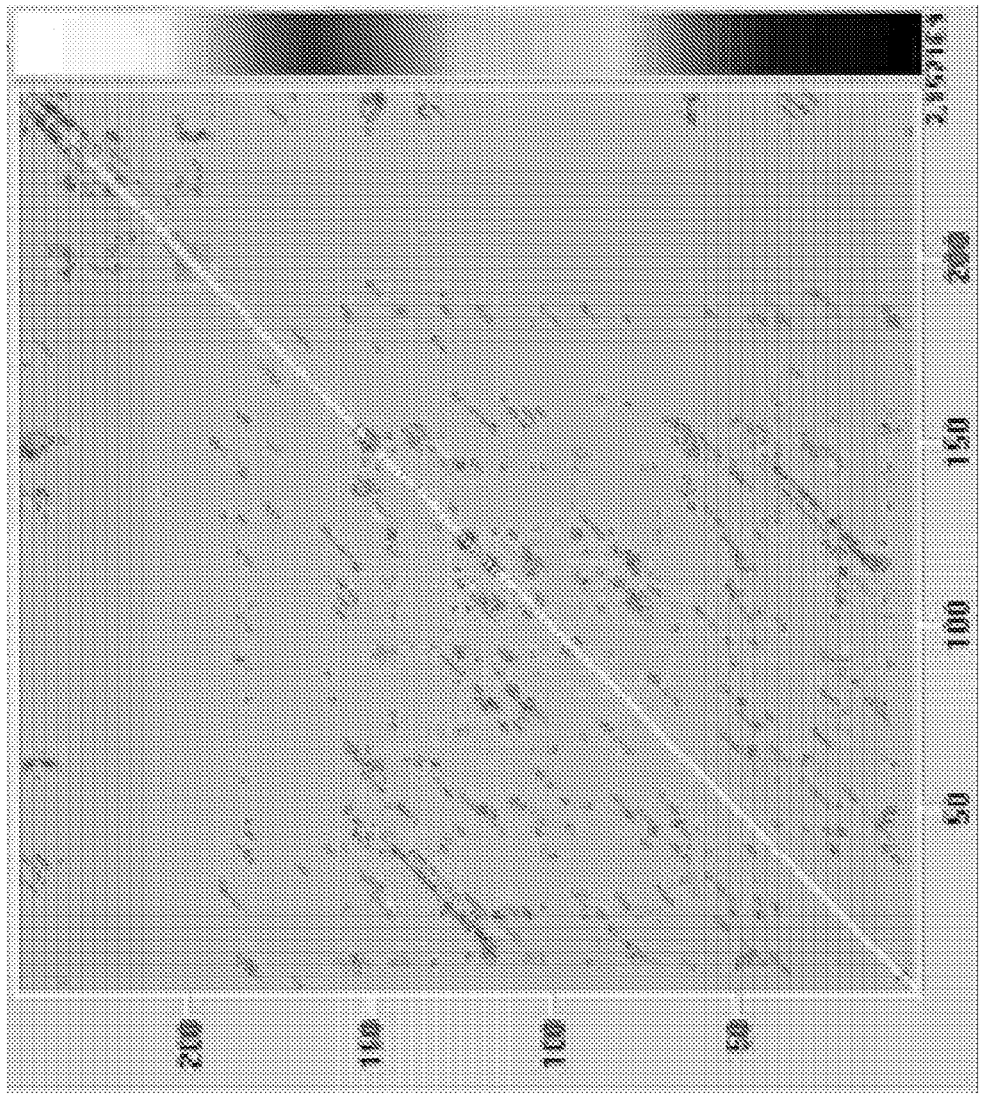
Figure 19A:
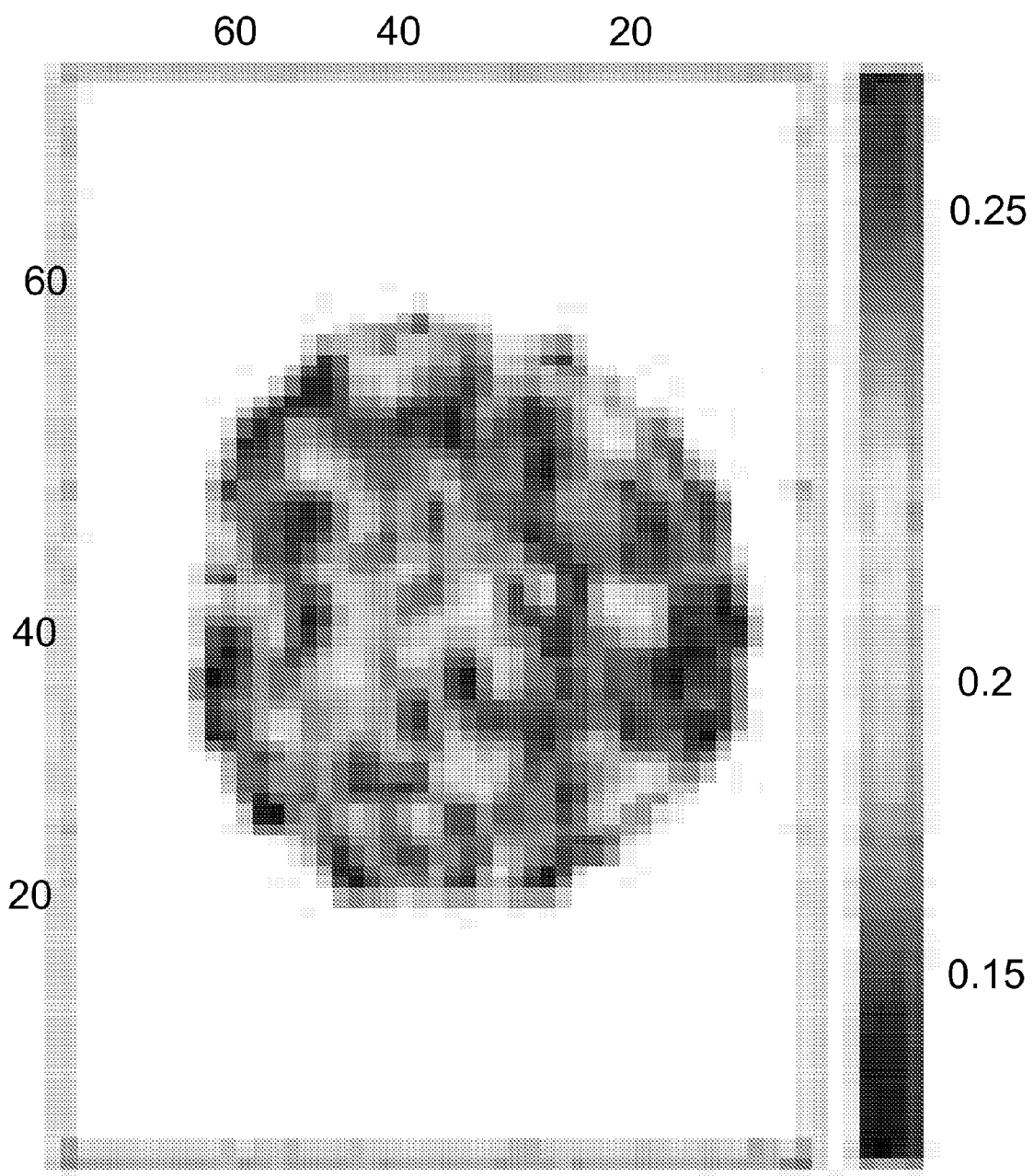
Figure 19B:
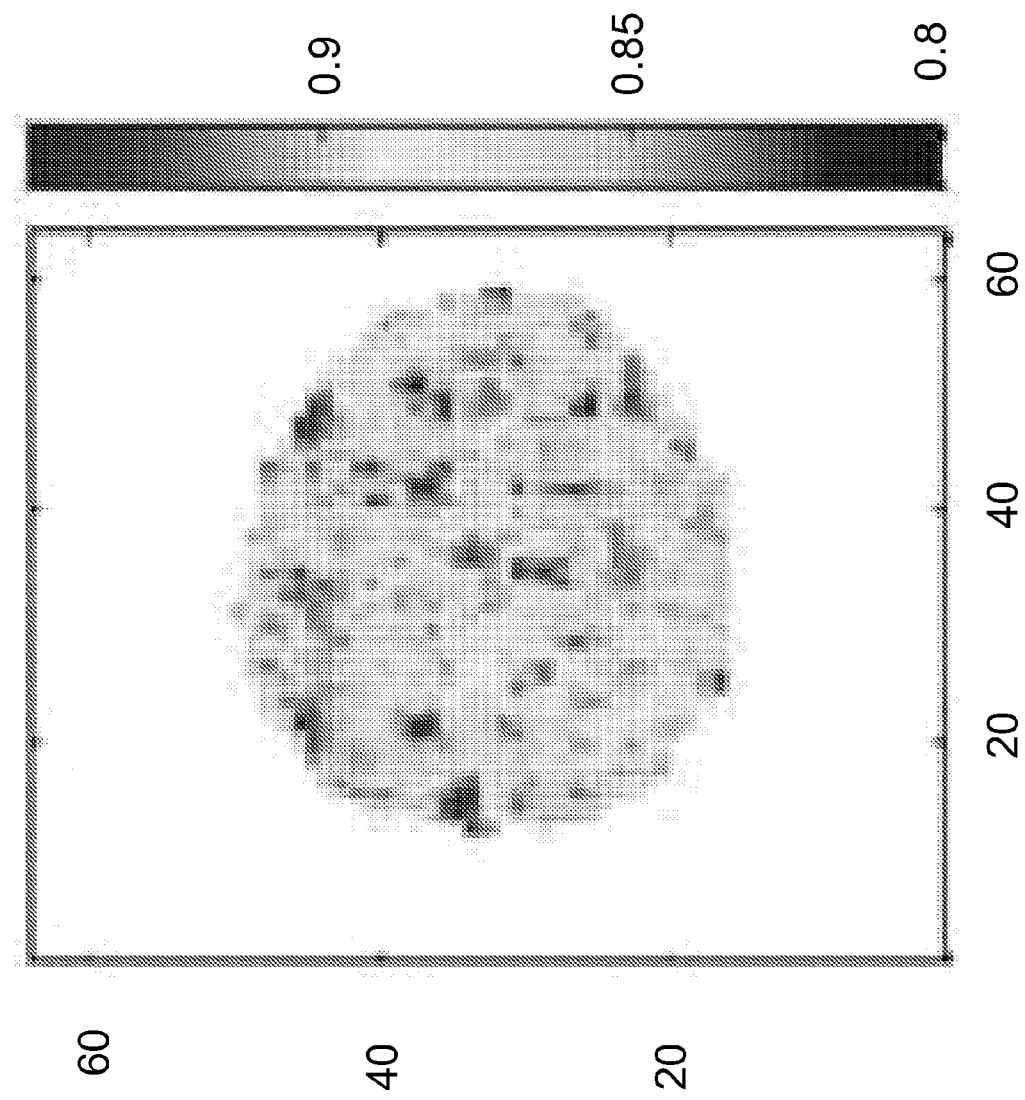
Figure 19D:
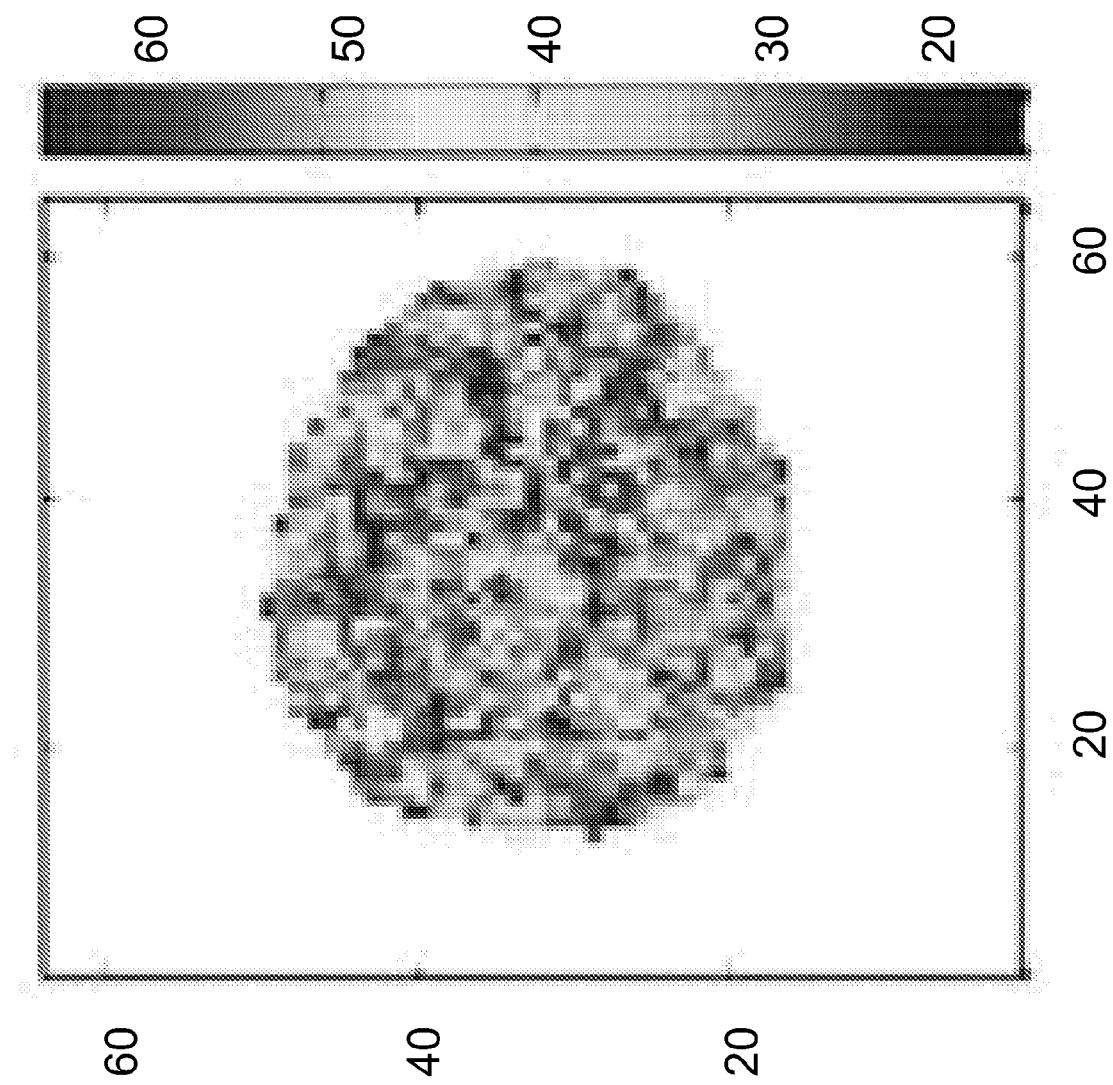
Figure 19E:
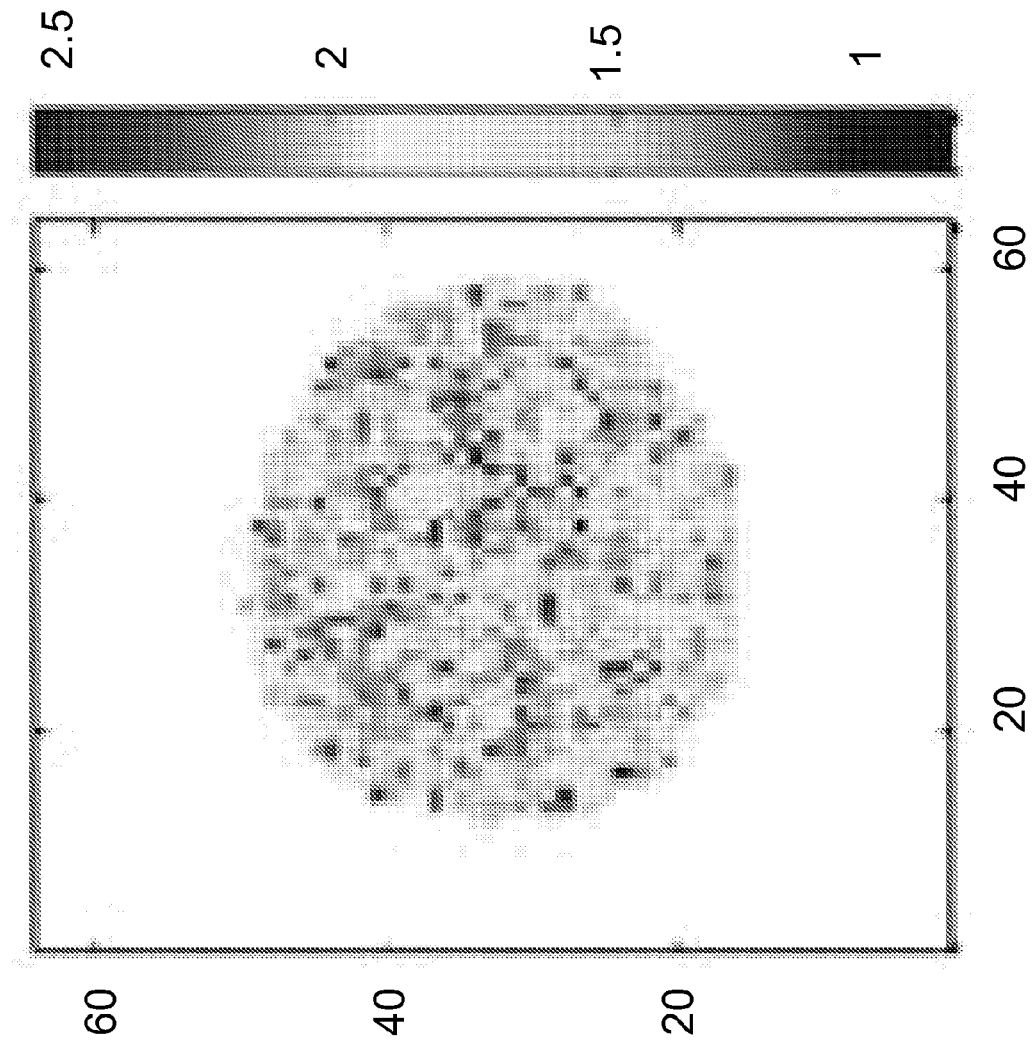
Figure 19F:
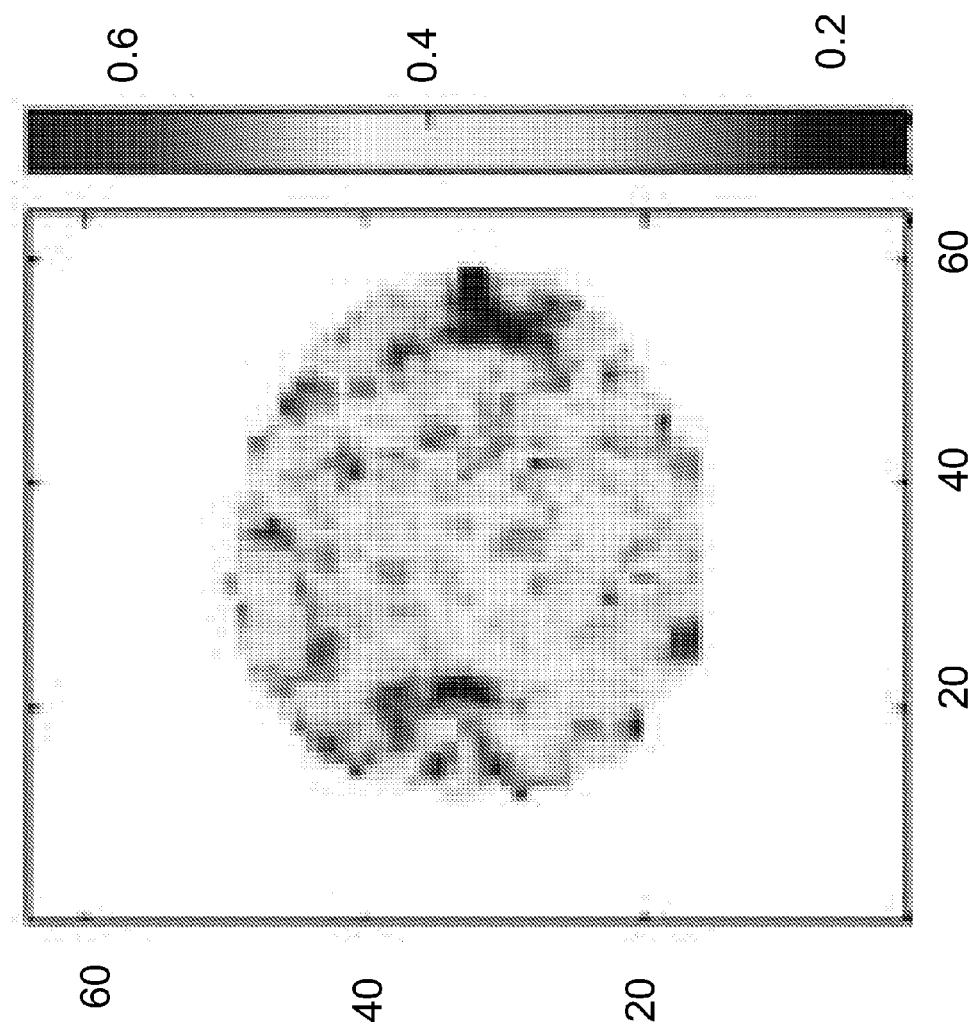
Figure 19G:
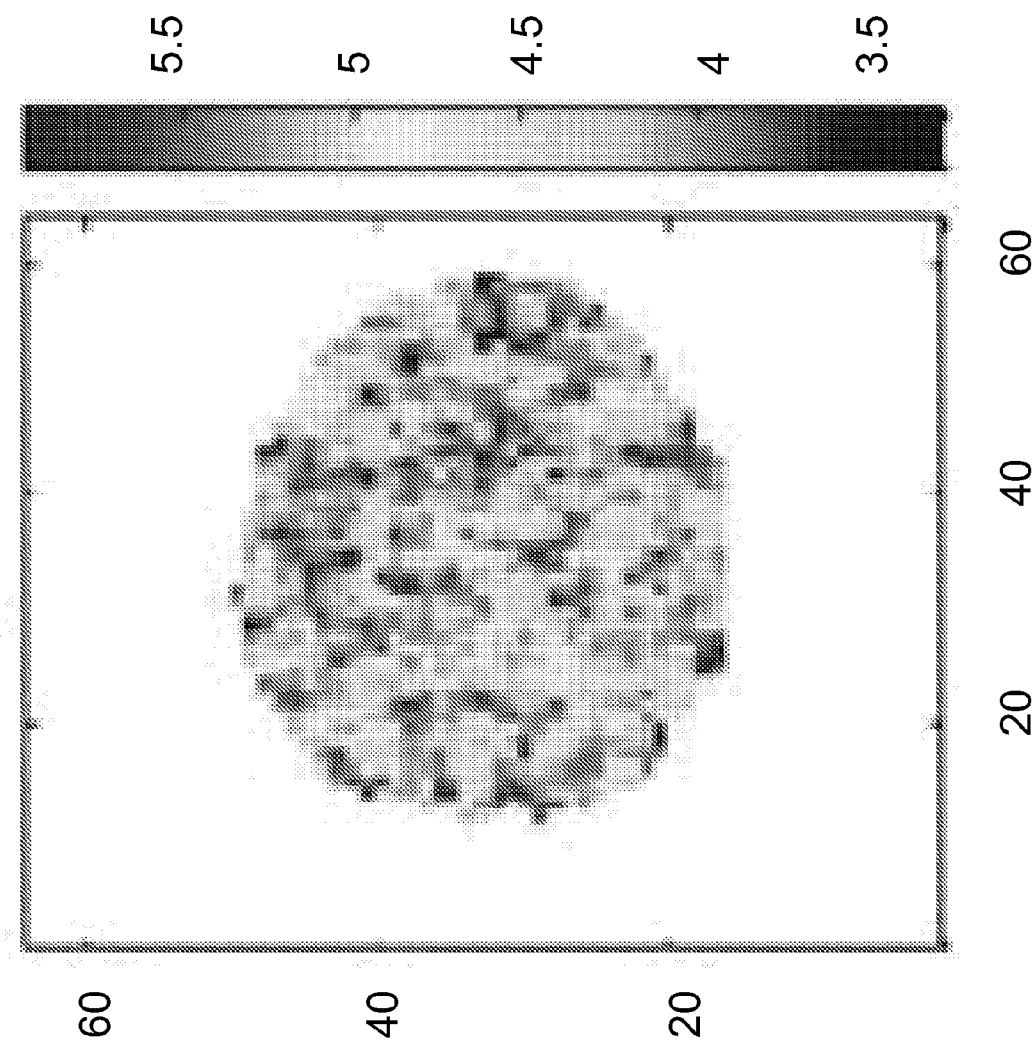
Figure 19H:
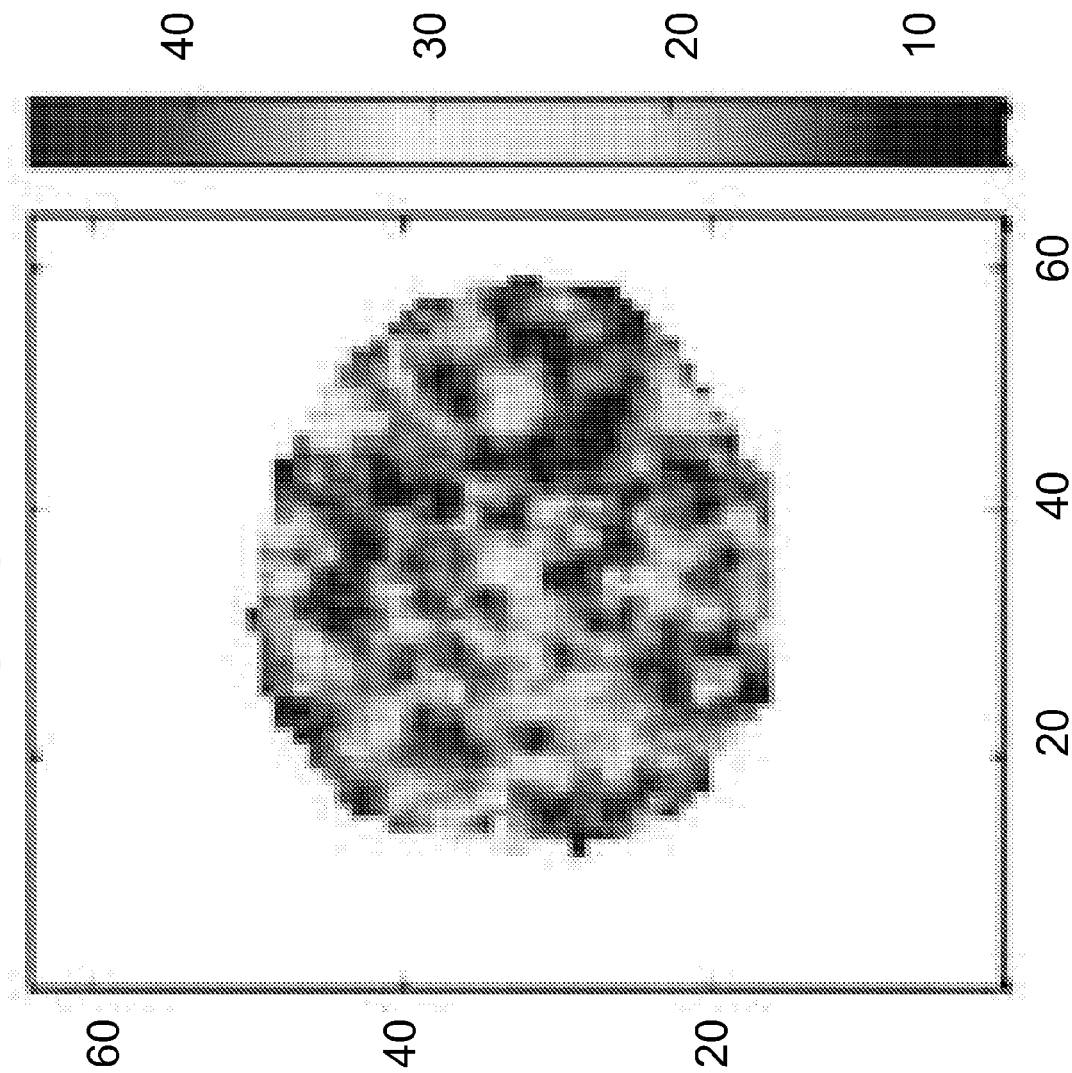
Figure 19I:
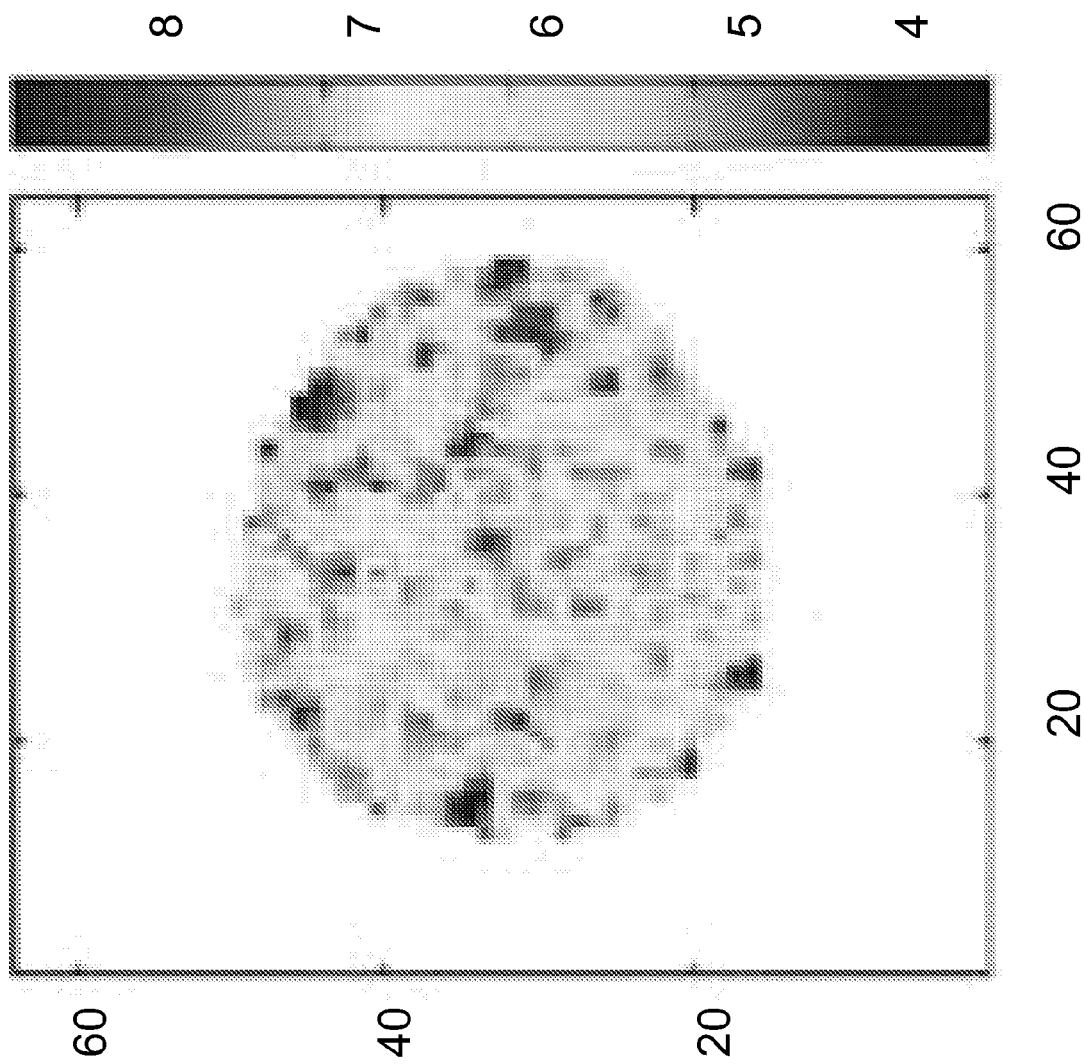
Figure 19J:
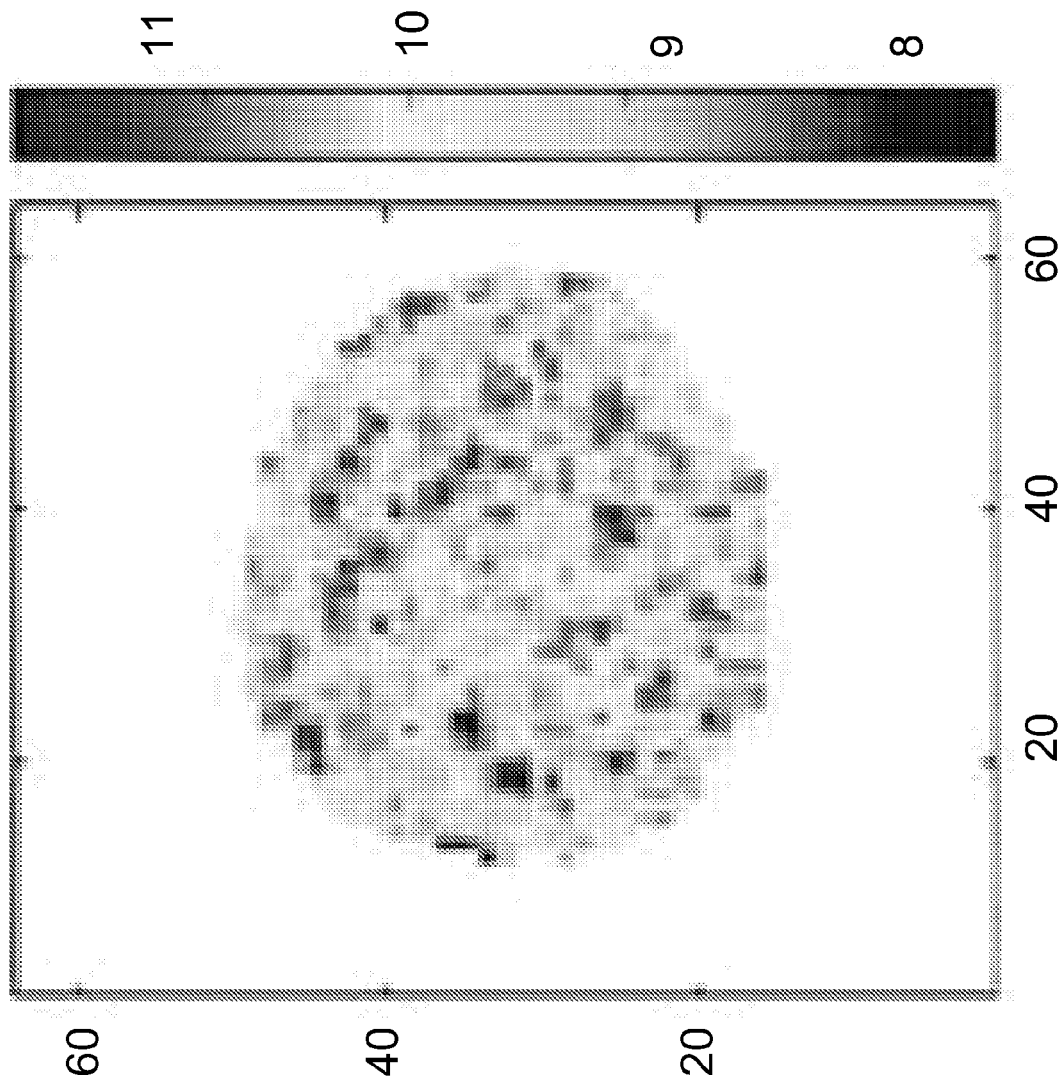

Discrimination of Activated from Non-activated Brain Areas by RQA of BOLD Studies This example illustrates the use of the present methods to provide two dimensional images of a human brain based on RQA variables calculated from time variable signals generated from a BOLD study. In this study different regions of a healthy subject's brain were activated in response to finger tapping while T2*-weighted magnetic resonance signals were collected from different volume elements (voxels) of the subject's brain. For the purposes of this experiment, signals were collected from a brain slice defined by a 64×64 matrix of contiguous voxels with a volume of 3×3×4.4 mm3. The magnetic resonance signals were collected from both activated and non-activated regions of the brain. FIGS. 17a-17b show the magnetic resonance signals obtained from five contiguous voxels in an active region of the brain (17a) and the magnetic resonance signals obtained from five contiguous voxels in a non-active region of the brain (17b). FIG. 18 shows the recurrence plots for each of the voxels displayed in FIGS. 17a-17b. FIGS. 18a-18e show the recurrence plots for the signals collected from the activated region of the brain and FIGS. 18f-18j show the recurrence plots for signals collected from the non-activated region of the brain. Ten RQA variables were calculated for each of the volume elements in the volume element array and an image showing the spatial distribution of the RQA variables of the brain slice was generated for each of the ten variables. The ten variables calculated from the recurrence plot were: REC, DET, MEANLINE, MAXLINE, ENT, LAM, TRAPT, MAXVERT, RECUTIME1 and RECUTIME2. FIGS. 19a-19j show the resulting images for each of the ten RQA variables. The images of FIGS. 19a-19j present graphical representations based on a false color scale of the ten RQA variables. The working parameters of RQA were adjusted to the following values and kept the same in all cases: embedding dimension=8; shift length (lag between subsequent windows)=1; distance=Euclidean; radius=1.7 standard deviation (SD) units in the distribution of distances; deterministic line=2).

Example 4

Figure 20:
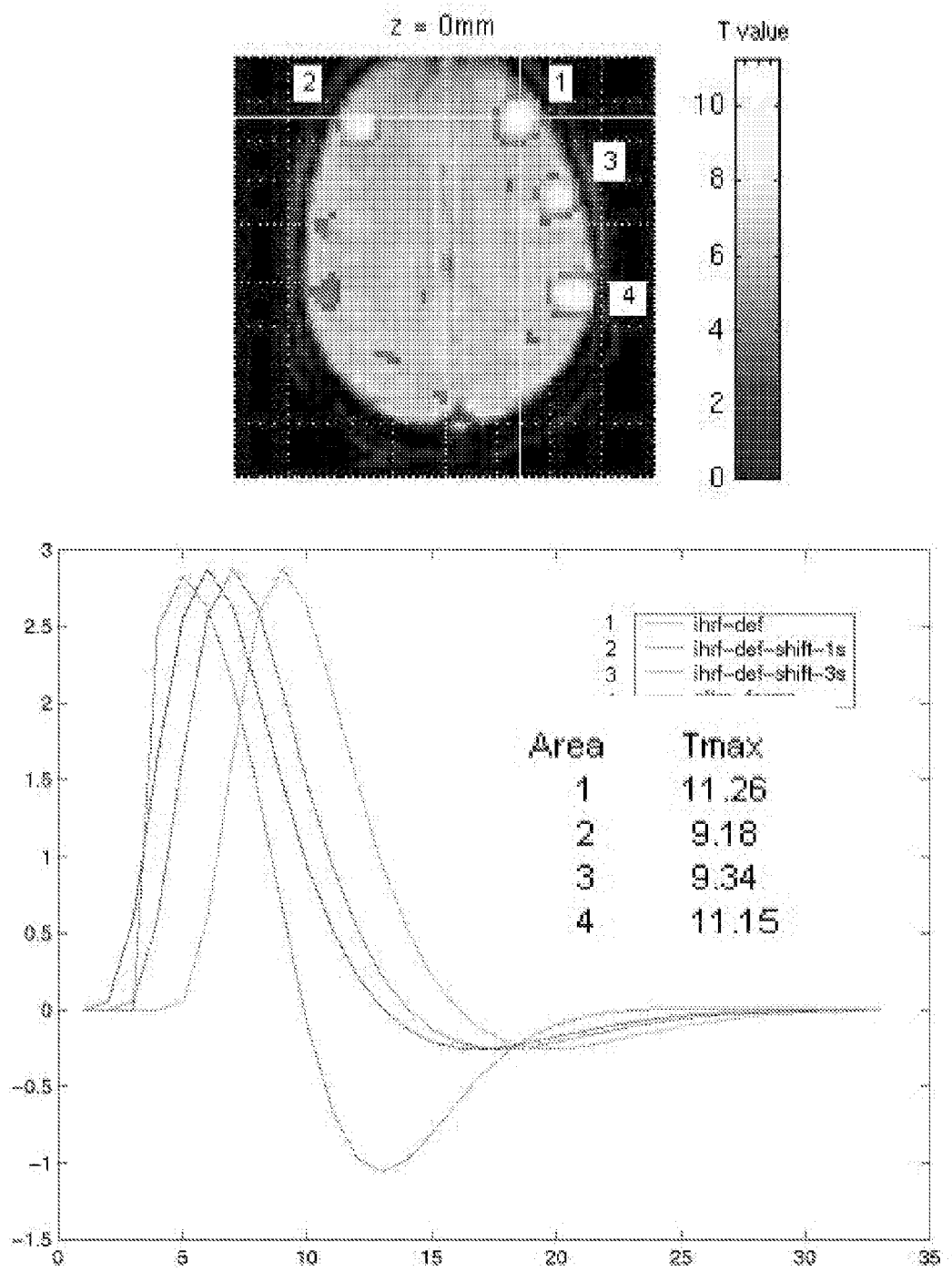
FIG. 20 shows four simulated hemodynamic response signals as described in Example 4 (lower panel) and a simulated brain slice depicting four activated regions as described in Example 4.
Figure 21A:
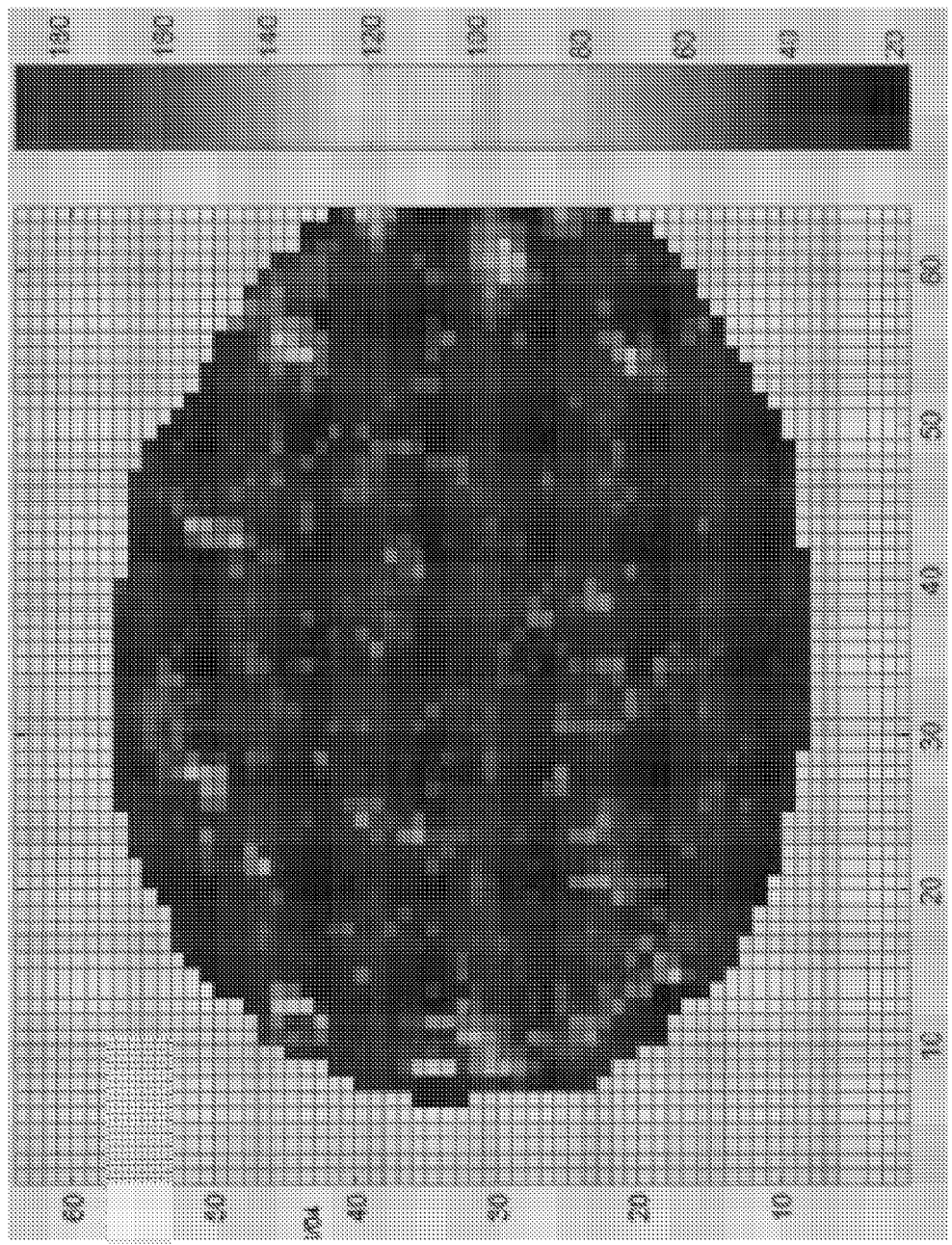
FIGS. 21a-21d show the autocorrelations and cross-correlations for the MAXLINE and LAM values generated from the system of Example 4.
Figure 21B:
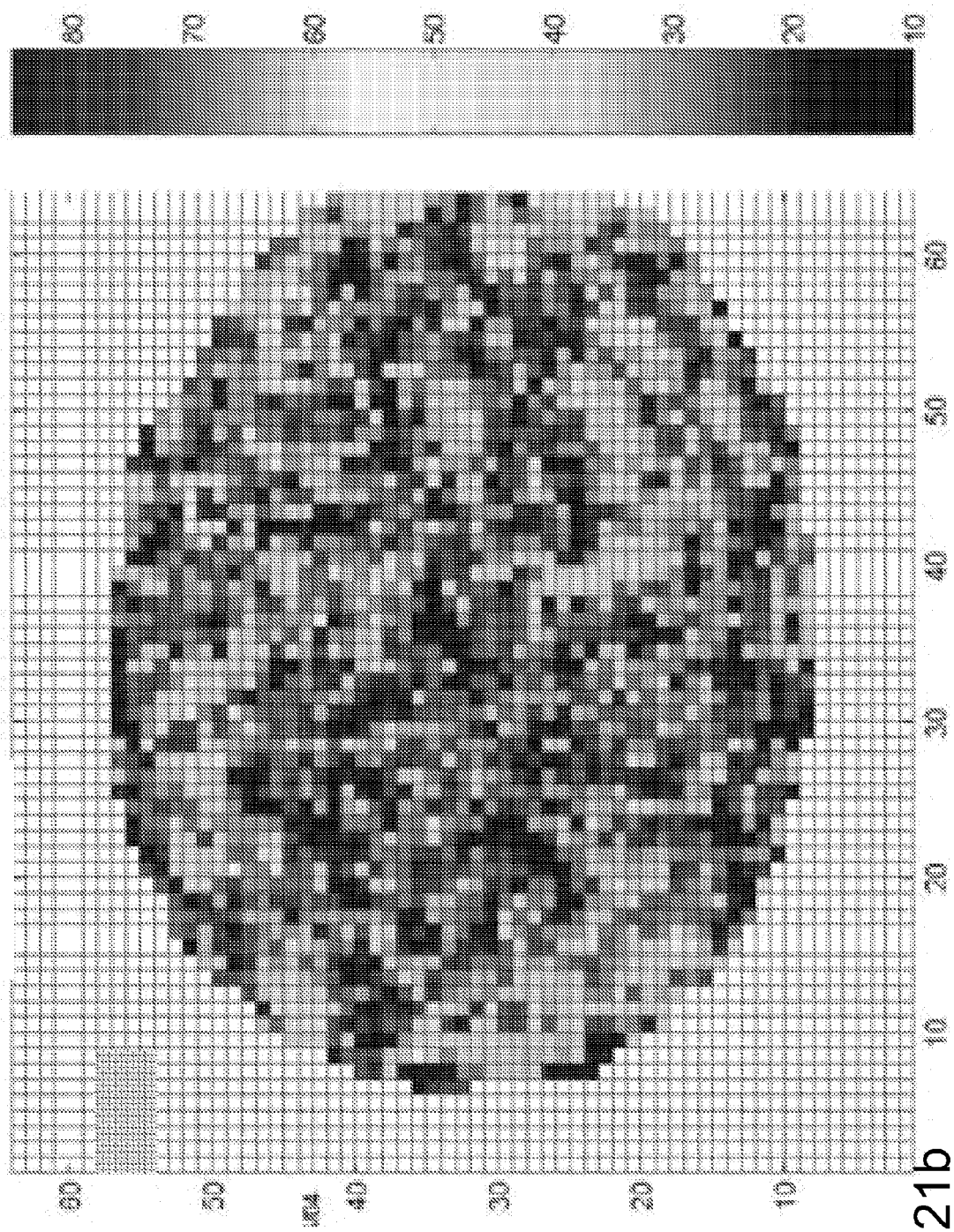
Figure 21C:
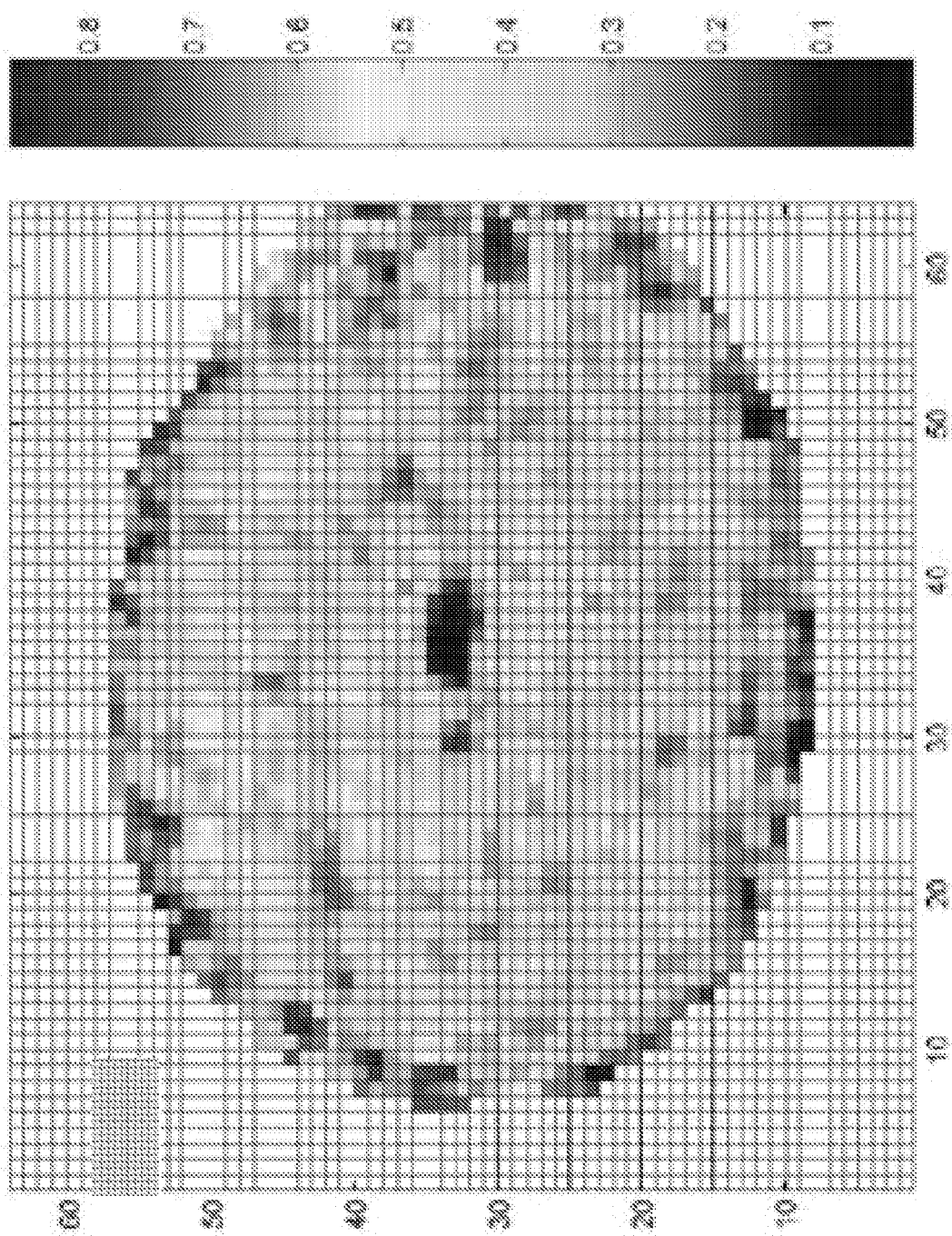
Figure 21D:
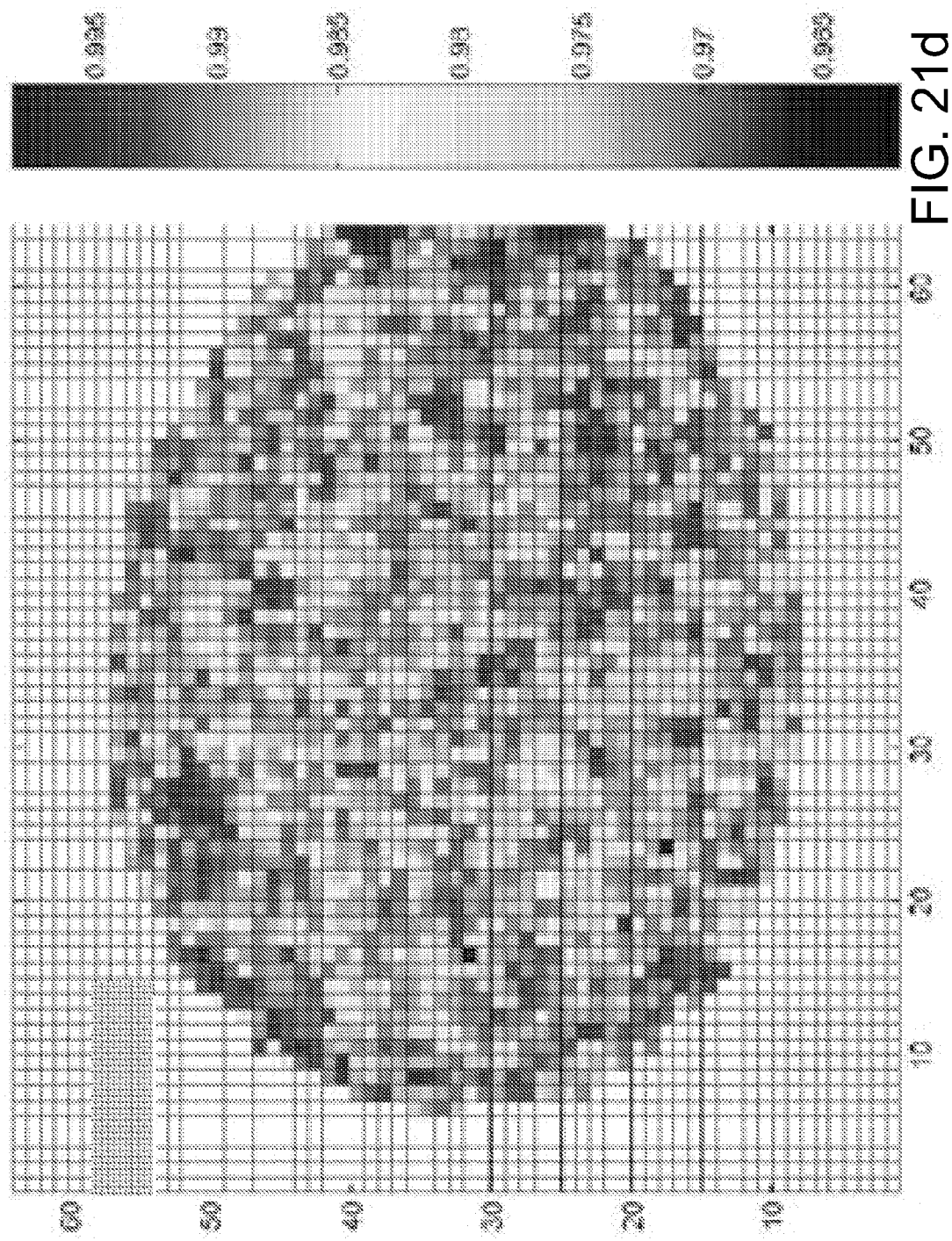

Analysis of the Resting Human Brain with and without Simulated BOLD Activation by RQA This example illustrates the use of the present methods to provide two dimensional images of a human brain obtained from a subject in a resting condition. The aim of these simulations was also to assess the robustness of RQA towards changes in the shape of the hemodynamic response (BOLD response). In this example four different simulated hemodynamic response signals were added to four distinct brain region signals acquired for a human brain at rest. Each simulated hemodynamic response is the convolution between a canonical hemodynamic response (combination of gamma functions) and a train of simulated stimulus events, occurring for 10 subsequent timepoints (ON) folllowed by 10 timepoints with activation (OFF) being repeated 12 times. FIG. 20 (lower panel) shows the four canonical hemodynamic response functions used for the simulations (labeled 1-4). FIG. 20 (upper panel) is an image of the brain slice showing the four regions of activation (1-4), as defined by conventional statistical regression analysis techniques. The simulated brain slice was sectioned into a 64×64 array of volume elements and RQA was used to calculate MAXLINE and LAM for each of the volume elements. The resulting spatial distributions of the MAXLINE (21a and 21b) and LAM (21c and 21d) variables are shown in FIGS. 21a-21d as calculated from standard recurrence plots (21a and 21c) or from plots including the response and the stimulation signal (cross-correlation) over the two axes (21b and 21d).

Example 5

Analysis of the Human Brain Activity by RQA

RQA analysis was used to study brain activity in a 24 year-old human male. A total of 270 BOLD sensitive image volumes of the brain were acquired with a Siemens Vision Magnetom MR system (Siemens Medical Systems, Erlangen, Germany) operating at 1.5 T and equipped for echo-planar imaging. Each volume was subdivided in 11 planes, starting from the vertex and stretching caudally (radio-frequency pulse: 60°; TR: 1000 ms; TE: 60 ms; in-plane resolution: 3×3 mm, slice thickness=4 mm and gap between slices=0.4 mm). The 14 initial BOLD images were discarded from further analysis to remove any possible T1 saturation effects. Visual stimuli indicating onset of the events (finger tapping) were projected via mirroring to a front projection screen using a LCD video projector (Model VPL-351QM, Sony Corp., Tokyo) located inside the MR room and connected to a PC located outside the MR room.

The subject had to fixate on a front projection screen on which the visual stimuli were presented. In response to the occurrence of a green dot on the monitor (with a 16 MR scans ON/OFF cycle), the volunteer had to push a button on a response box.

Figure 22A:
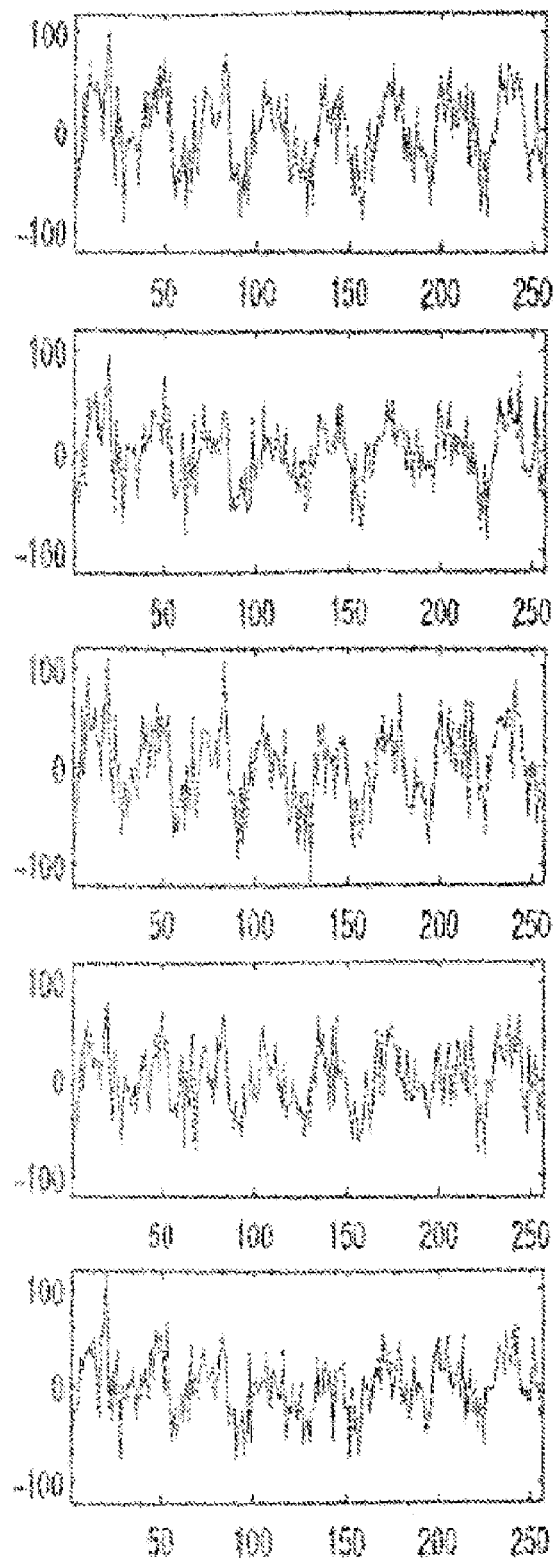
FIGS. 22a and 22b show magnetic resonance signals collected from five contiguous voxels of activated (a) and non-activated (b) regions of subject's brain.
Figure 22B:
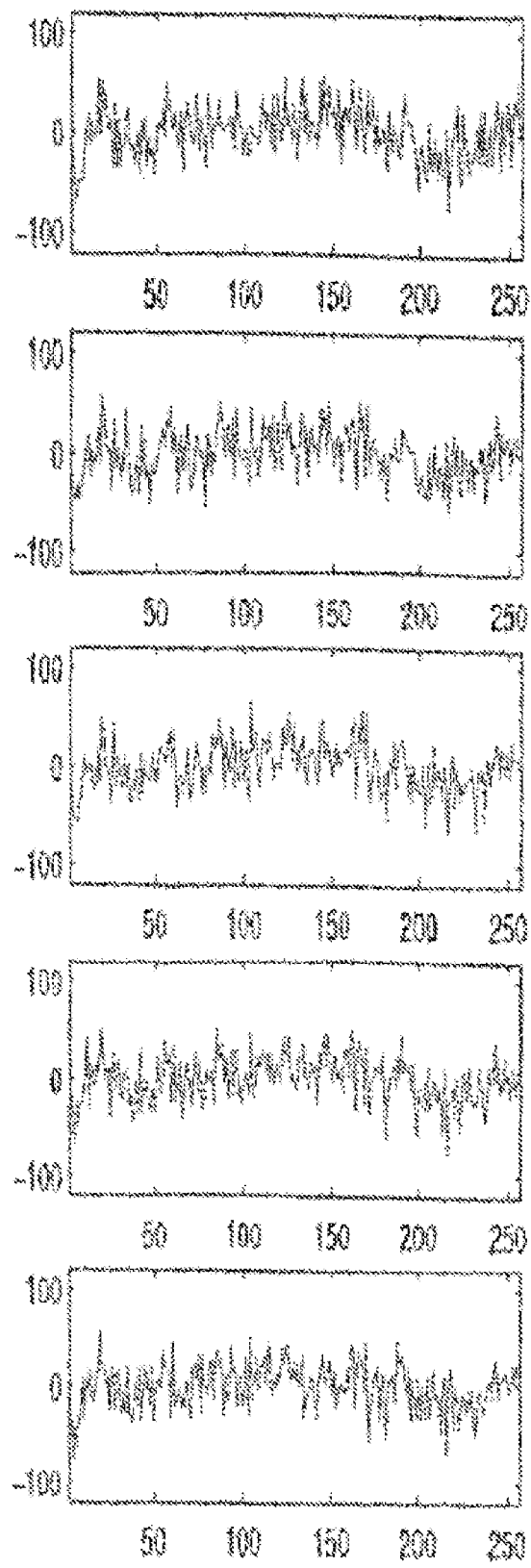

FIGS. 22a and 22b show the magnetic resonance signals obtained in 256 scans from five contiguous voxels in an active region of the brain (22a) and the magnetic resonance signals obtained from five contiguous voxels in a non-active region of the brain (22b). In the present context, activity is determined by means of the conventional approach (statistical threshold $p<0.001$, uncorrected for multiple comparisons, and $t>3.01$). Statistical t-values ranged from 7.8 to 10.8 and from −0.4 to −1 for time series "a" and "b", respectively. For each collected MR voxel time-series, $y_{raw}$, three preprocessing steps were performed previous to statistical analysis. Correction for involuntary motion during MR scanning; then, in order to increase the MR signal-to-noise-ratio, a spatial smoothing filter was applied for each brain 3D-volume by convolution with an isotropic Gaussian kernel (FWHM=6 mm for our data); afterwards, removal of low frequency noise (e.g. static magnetic field drift and other aliased effects) was achieved by temporal linear detrending of each time-series.

Figure 23A:
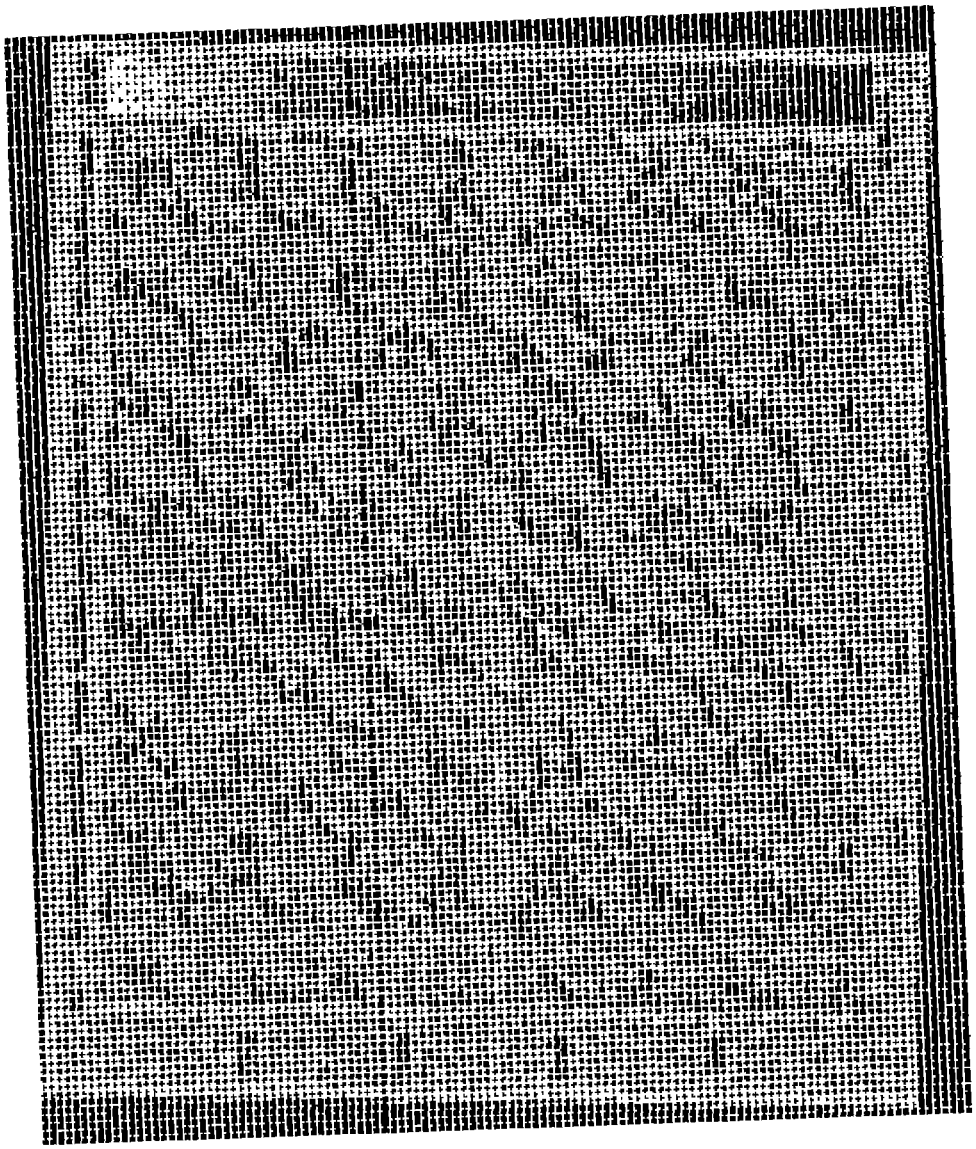
Figure 23B:
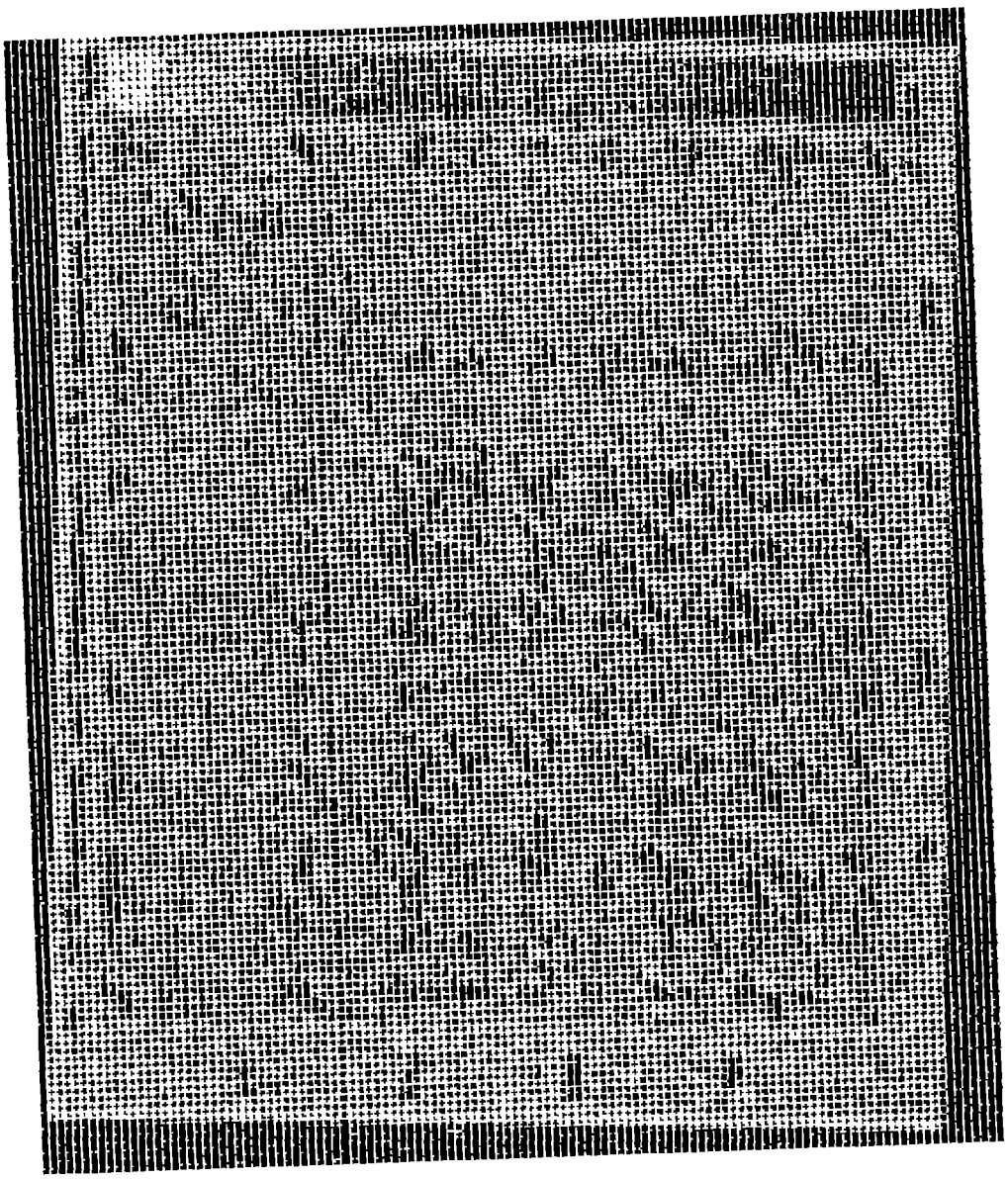

The two classes of time-series, "a" and "b", could be discriminated by RQA variables. Auto- and cross-recurrence plots were generated for each time-series and examples relative to time-series 3a and 3b of FIGS. 22a and 22b are shown in FIGS. 23a and 23b, respectively. A repetitive pattern is clearly evident in FIG. 23a (for example, on the diagonal 8 mini-blocks, about 16 points long, as the design ON periods, can be distinguished); for time-series 3b (FIG. 23b) recurrences are less pronounced, although the presence of some structure indicates the somewhat colored feature of the noise. Quantification of recurrences leads to a variable REC that was twice as high for time-series 2a, than for 2b.

Figure 24A:
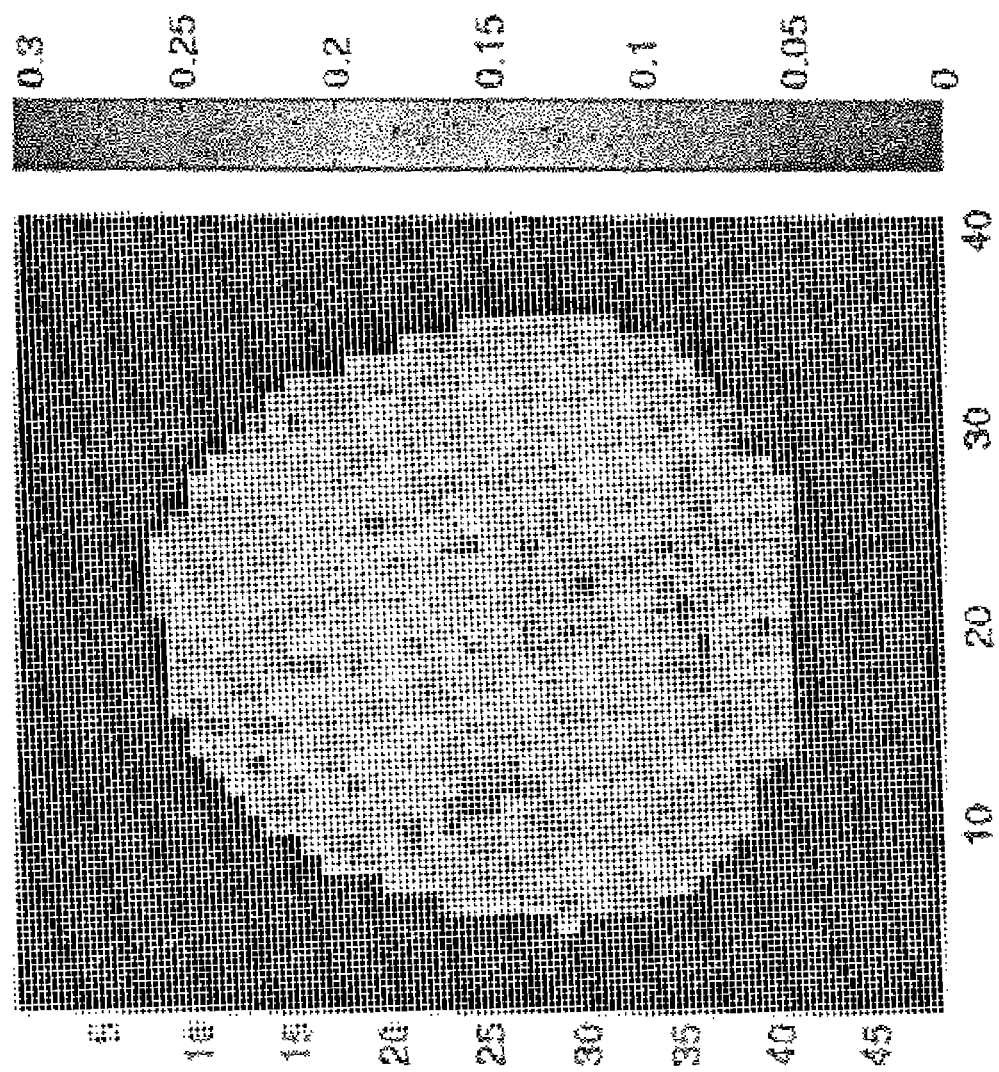
FIGS. 24a-24d show the cross-recurrence and cross-maxline computed from the data of Example 5 using RQA and the results of conventional analysis.
Figure 24B:
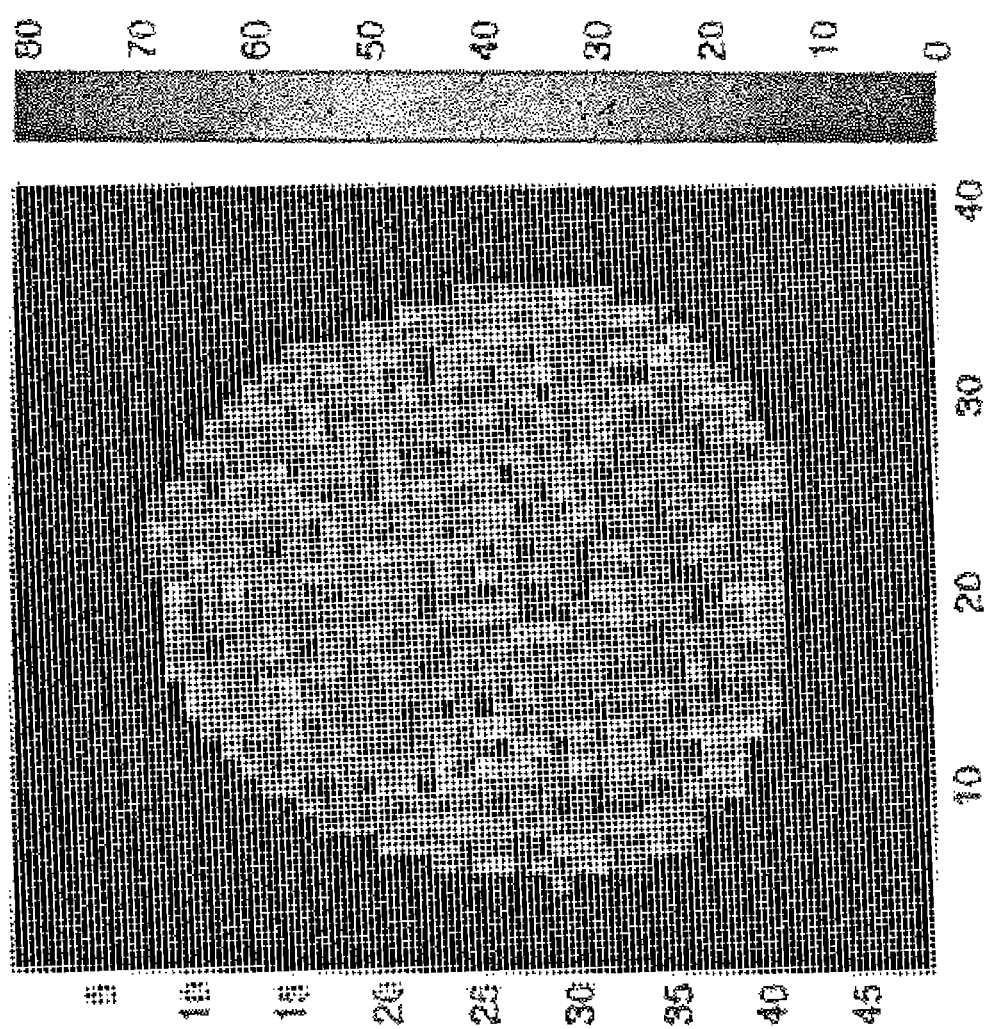

The same analytical strategies (conventional and RQA) were applied to the entire 3D brain volume collected by fMRI. Ten RQA variables were calculated for each of the volume elements in the volume element array and an image showing the spatial distribution of the RQA variables of each brain slice was generated for each of the ten variables (calculated both for auto- and cross-recurrence plots). FIGS. 24a and 24b shows the resulting images for two of the ten RQA variables relative to one slice, namely cross-REC and cross-MAXLIN.

The working parameters of RQA were adjusted to the following values and kept the same in all cases: embedding dimension=8; shift length (lag between subsequent windows)=1; distance=Euclidean; radius=1.7 standard deviation (SD) units in the distribution of distances; deterministic line=2).

Figure 24C:
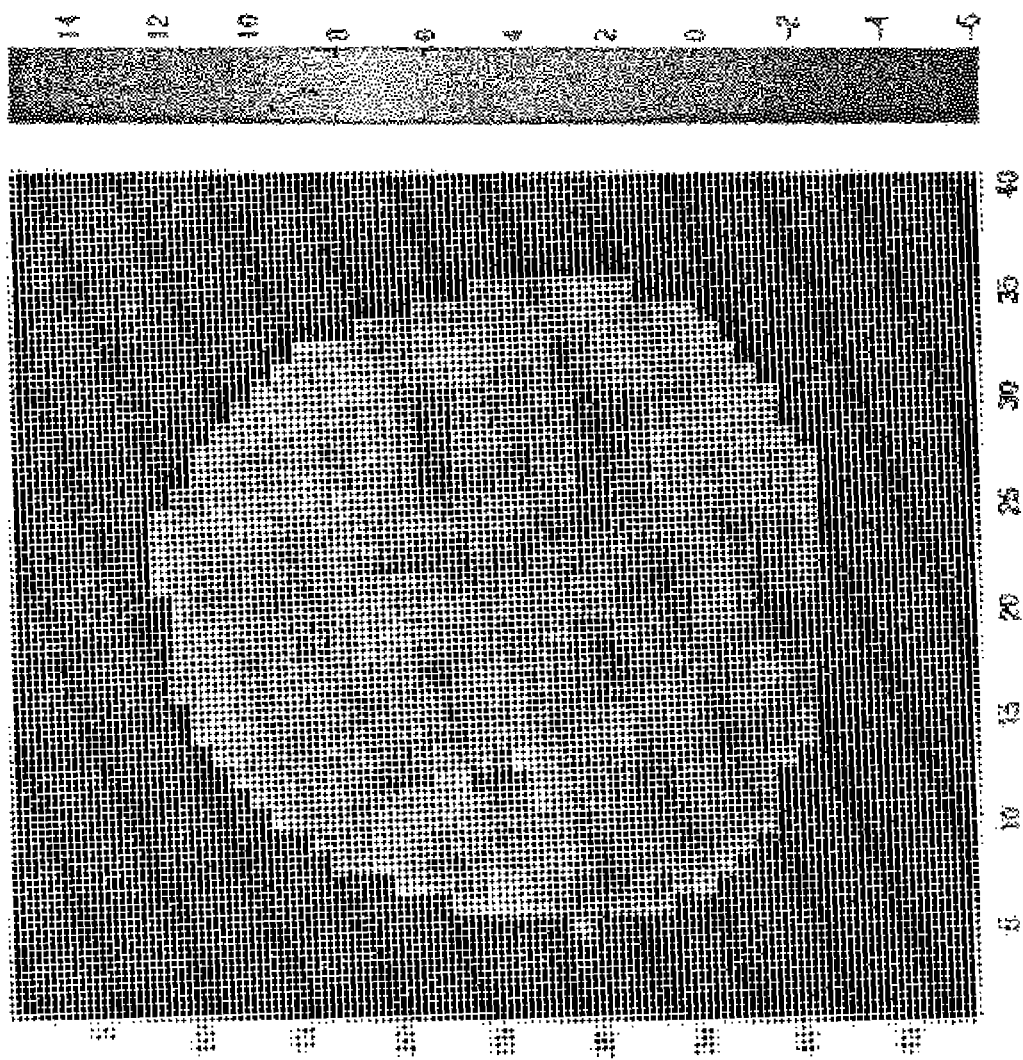
Figure 24D:
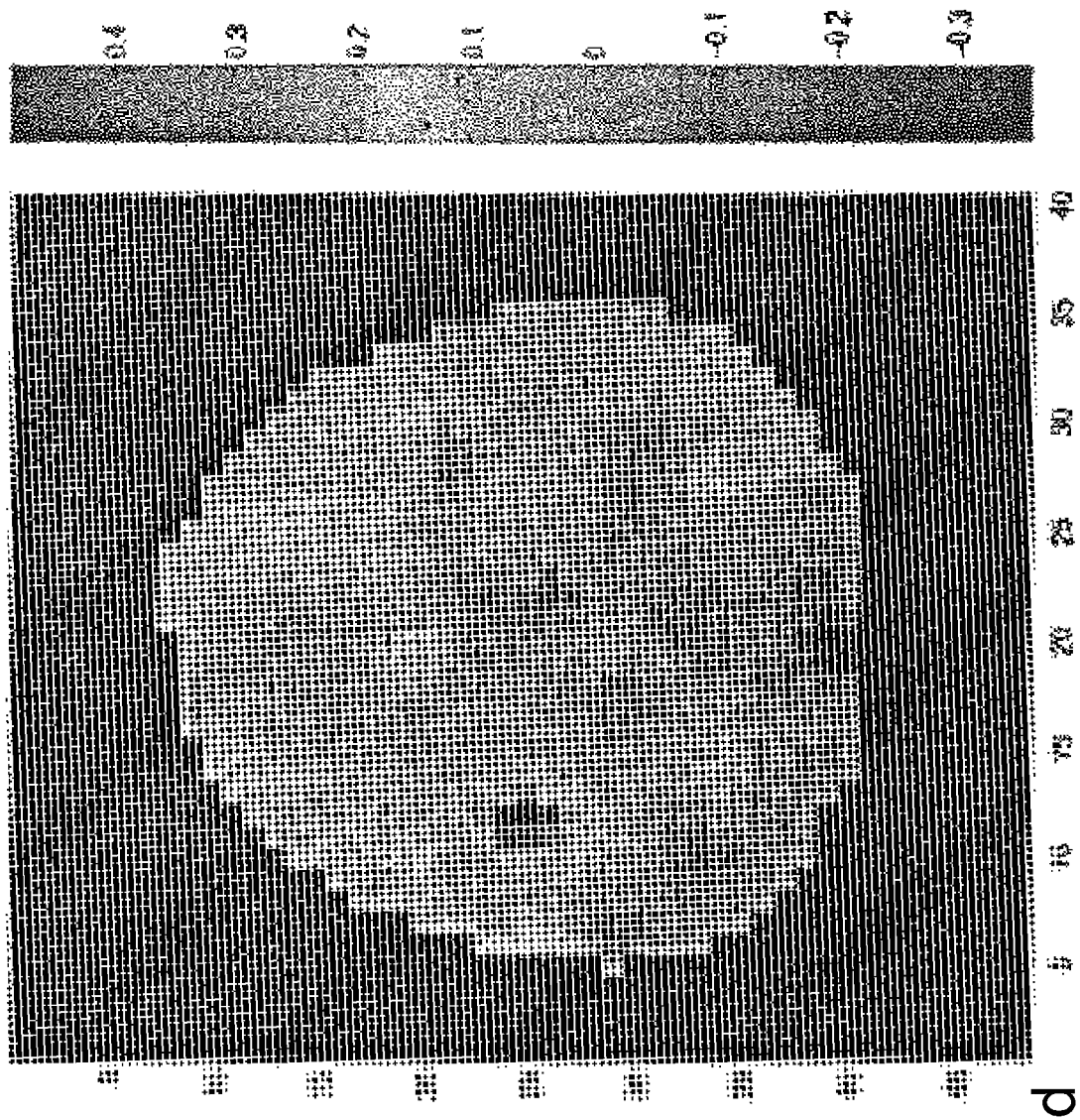
Figure 25:
FIG. 25 is a flowchart of the steps in a conventional linear regression analysis and in a recurrence quantification analysis.

For comparison, FIGS. 24c and 24d contain the results (β- and t-values) over the same brain regions obtained by conventional linear regression analysis. The graphical representation of FIGS. 24a-24d is based on a false grey scale. FIG. 25 provides a flow chart showing some basic steps in both the conventional linear regression analysis and the recurrence quantification analysis.

At least four RQA descriptors (auto-recurrence, auto-laminarity, cross-recurrence and cross-maxline) were able to detect regions common to conventional analysis activation maps. In the former maps the activated regions appear somewhat more blurred; their location, however, could be characterized by a completely iHRF-assumption-free approach. These results demonstrate that RQA has the exclusive feature of being model-free and of detecting potentially both linear and non-linear dynamic processes, without requiring stationarity of the signal under investigation.

The invention has been described with reference to specific and illustrative embodiments. However, it should be understood that many variations and modifications may be made while remaining within the spirit and scope of the invention.

What is claimed is:

1. A method for creating spatial distributions of time variable signals, the method comprising:
receiving a plurality of data elements associated with a digital image of a dynamic system;
calculating, with a processor of a computing device, a recurrence quantification analysis variable for each of the received plurality of data elements; and
displaying the calculated recurrence quantification analysis variables as a spatial distribution.

2. The method of claim 1, wherein the spatial distribution forms the digital image of the dynamic system.

3. The method of claim 2, wherein the digital image is a two-dimensional image or a three-dimensional image.

4. The method of claim 1, wherein the plurality of data elements are spatially contiguous.

5. The method of claim 1, wherein the dynamic system is a biological system.

6. The method of claim 5, wherein the dynamic system is a brain.

7. The method of claim 6, wherein the spatial distribution is a two dimensional image of a cross-sectional slice of the brain.

8. The method of claim 6, wherein the plurality of data elements are indirect measurements of oxygen-related metabolic events in different parts of the brain.

9. The method of claim 8, wherein the plurality of data elements are blood oxygen level dependent signals.

10. The method of claim 1, wherein the dynamic system is a geographical region.

11. The method of claim 10, wherein the geographical region is an ocean and the plurality of data elements comprise surface temperature measurements.

12. The method of claim 1, wherein the plurality of data elements are functional magnetic resonance signals.

13. The method of claim 1, wherein the recurrence quantification analysis variable is selected from the group consisting of a percent recurrence, a percent determinism, an entropy, a laminarity, a trapping time, a maximum length of vertical structures in a recurrence plot, a mean length of vertical structures in a recurrence plot, and a recurrence time.

14. The method of claim 1, wherein the digital image is a color image comprising a plurality of pixels and further wherein the color of each pixel corresponds to the value of the recurrence quantification analysis variable for that pixel.

15. The method of claim 1, wherein the digital image is a color image comprising a plurality of voxels and further wherein the color of each voxel corresponds to the value of the recurrence quantification analysis variable or that pixel.

16. The method of claim 1, wherein the spatial distribution shows the autocorrelation of the time variable signal.

17. The method of claim 1, wherein the spatial distribution shows the cross-correlation between the time variable signal with a stimulating signal.

18. A non-transitory computer-readable medium including computer-readable instructions stored therein that, upon execution by a processor of an electronic device, cause the electronic device to:
receive a plurality of data elements associated with a digital image of a dynamic system;
calculate a recurrence quantification analysis variable for each of the received plurality of data elements; and
display the calculated recurrence quantification analysis variables as a spatial distribution.

19. An electronic device comprising:
a processor; and
a computer-readable medium including computer-readable instructions stored therein that, upon execution by the processor, perform operations comprising
receiving a plurality of data elements associated with a digital image of a dynamic system;
calculating a recurrence quantification analysis variable for each of the received plurality of data elements; and
displaying the calculated recurrence quantification analysis variables as a spatial distribution.

* * * * *